US012315429B2

(12) United States Patent
Kim et al.

(10) Patent No.: US 12,315,429 B2
(45) Date of Patent: May 27, 2025

(54) DISPLAY DEVICE

(71) Applicant: LG Display Co., Ltd., Seoul (KR)

(72) Inventors: JinKoo Kim, Gyeonggi-do (KR); JongJin Park, Gyeonggi-do (KR); Changeui Hong, Cheonan-si (KR); SeongJo Kim, Gyeonggi-do (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 17/967,136

(22) Filed: Oct. 17, 2022

(65) Prior Publication Data

US 2023/0196985 A1 Jun. 22, 2023

(30) Foreign Application Priority Data

Dec. 22, 2021 (KR) ........................ 10-2021-0184911

(51) Int. Cl.

| | |
|---|---|
| ***H01L 27/146*** | (2006.01) |
| ***G06F 3/041*** | (2006.01) |
| ***G06V 40/13*** | (2022.01) |
| ***G09G 3/32*** | (2016.01) |
| ***H10K 59/131*** | (2023.01) |

(52) U.S. Cl.
CPC ....... *G09G 3/32* (2013.01); *G09G 2300/0465* (2013.01); *G09G 2320/0233* (2013.01); *G09G 2360/14* (2013.01)

(58) Field of Classification Search
CPC ............. G09G 3/32; G09G 2300/0465; G09G 2320/0233; G09G 2360/14
See application file for complete search history.

(56) References Cited

U.S. PATENT DOCUMENTS

| | | | | |
|---|---|---|---|---|
| 11,336,833 | B1 * | 5/2022 | Cutler | H04N 23/695 |
| 2011/0235147 | A1 * | 9/2011 | Lee | G02B 26/02 359/230 |
| 2017/0364763 | A1 * | 12/2017 | Jin | G06F 3/0412 |
| 2019/0303640 | A1 * | 10/2019 | Song | G06V 40/1312 |
| 2020/0380239 | A1 * | 12/2020 | Lee | H10K 59/131 |
| 2021/0056282 | A1 * | 2/2021 | Kim | G02F 1/136 |
| 2021/0097252 | A1 * | 4/2021 | Lee | G06V 40/1329 |
| 2022/0036776 | A1 * | 2/2022 | Chao | H01L 27/156 |
| 2022/0050993 | A1 * | 2/2022 | Chung | G06V 40/1318 |
| 2022/0416213 | A1 * | 12/2022 | Sakuma | H10K 71/00 |
| 2023/0387144 | A1 * | 11/2023 | Jung | G09F 9/33 |

FOREIGN PATENT DOCUMENTS

| | | | | |
|---|---|---|---|---|
| CN | 105226068 A | * | 1/2016 | H01L 27/12 |
| CN | 112364797 A | * | 2/2021 | G06K 9/00 |
| CN | 114529956 A | * | 5/2022 | H04N 23/73 |
| KR | 20200065383 A | | 6/2020 | |
| WO | WO 2022/247167 A1 | * | 12/2022 | H01L 27/12 |

OTHER PUBLICATIONS

Office Action in Korean Appln. No. 20210184911, mailed on Dec. 22, 2024, 8 pages (with English translation).

* cited by examiner

*Primary Examiner* — Lin Li
(74) *Attorney, Agent, or Firm* — Fish & Richardson P.C.

(57) ABSTRACT

A display device includes a display panel including a plurality of light emitting elements, a moving bar movable on a rear surface of the display panel, and a plurality of sensor modules mounted on the moving bar and configured to sense sensing light emitted from a rear surface of the display panel.

20 Claims, 26 Drawing Sheets

DISPLAY DEVICE

CROSS-REFERENCE TO RELATED APPLICATION

This application claims the priority of Korean Patent Application No. 10-2021-0184911, filed on Dec. 22, 2021, which is hereby incorporated by reference in its entirety.

BACKGROUND

Field of the Disclosure

The present disclosure relates to a display device.

Description of the Background

Among display devices currently being developed, there are self-luminous display devices with a display panel itself emitting light. The display panel of the self-luminous display device may include subpixels each including a light emitting element and a driving transistor for driving the light emitting element to emit light by itself.

The circuit elements, such as driving transistors and light emitting elements, disposed on the display panel of the self-luminous display device each have their own characteristic values. For example, driving transistors have a threshold voltage and mobility, and light emitting elements have a threshold voltage, as their unique characteristic values.

The circuit elements in each subpixel may degrade over driving time so that their unique characteristic values may vary. Each subpixel may have a different driving time so that variations in characteristic value between subpixels may differ. Accordingly, as the driving time elapses, a deviation between the characteristic values of the subpixels may occur, causing a deviation in luminance between the subpixels. The luminance deviation between the subpixels may deteriorate the luminance uniformity of the display panel, with the result of poor image quality.

In the display technology field, various techniques have been developed to sense and compensate for luminance deviations between subpixels. However, the current compensation techniques require a complicated subpixel structure and signal line structure for sensing the luminance deviation between subpixels, the driving method for sensing the characteristic values of the subpixels is complicated, and such issues may be an obstacle to enhancing the aperture ratio and implementing a high resolution.

SUMMARY

Accordingly, the present disclosure is to provide a display device capable of grasping the luminance deviation between subpixels through a simple sensing operation by way of a simple subpixel structure and signal line structure to thereby compensate for the luminance deviation and easier to implement a high aperture ratio and a high resolution.

The present disclosure is also to provide a display device capable of sensing the luminance of subpixels and compensating for the luminance deviation between subpixels even without the need for a complicated subpixel structure and complicated signal line structure and complicated sensing driving.

The present disclosure is also to provide a display device capable of performing an accurate compensation function by using a rear sensing structure of a display panel.

The present disclosure is also to provide a display device capable of performing an accurate compensation function by configuring a rear sensing structure of a display panel to be movable.

The present disclosure is also to provide a display device having a higher aperture ratio and higher resolution by sensing the luminance of subpixels and compensating for the luminance deviation between the subpixels without a complex subpixel structure and a complex signal line structure.

The present disclosure is also to provide a display device comprising a display panel including a plurality of light emitting elements, a moving bar movable on a rear surface of the display panel, and a plurality of sensor modules mounted on the moving bar and configured to sense sensing light emitted from a rear surface of the display panel.

The display device according to various aspects of the present disclosure may further comprise a sensing controller configured to control a movement of the moving bar and receive a sensing value from at least one of the plurality of sensor modules.

In the display device according to various aspects of the present disclosure, the display panel may include a plurality of sensing light emission holes for emitting the sensing light to the rear surface of the display panel.

In an aspect of the present disclosure, a display device includes a display panel including a plurality of light emitting elements and a plurality of sensing light emission holes through which light is emitted to a rear surface opposite to a viewing surface, and a plurality of sensor modules configured to sense light emitted through at least one of the plurality of sensing light emission holes.

The display device according to aspects of the disclosure may further comprise a sensing controller configured to receive a sensing value from at least one of the plurality of sensor modules.

The display device according to aspects of the disclosure may further include a moving bar movable on the rear surface of the display panel.

In the display device according to aspects of the disclosure, the plurality of sensor modules may be mounted on the moving bar.

In another aspect of the present disclosure, a display device includes a display panel including a plurality of light emitting elements, a sensor modules configured to sense sensing light emitted from a rear surface of the display panel, which is opposite to a viewing surface of the display panel, and a sensing controller configured to receive a sensing value from the sensor modules, and generate a compensation value for the light emitting element based on the received sensing value.

The display device according to various aspects of the present disclosure may further comprise a moving bar movable on the rear surface of the display panel under the control of the sensing controller, wherein the sensor module is mounted on the moving bar.

The display device according to various aspects of the present disclosure may further comprise a sensing light emission hole for emitting the sensing light to the rear surface of the display panel.

According to various aspects of the present disclosure, there may be provided a display device capable of sensing the luminance of subpixels and compensating for the luminance deviation between subpixels even without the need for a complicated subpixel structure and complicated signal line structure and complicated sensing driving.

According to various aspects of the present disclosure, there may be provided a display device capable of performing an accurate compensation function by using a rear sensing structure of a display panel.

According to various aspects of the present disclosure, there may be provided a display device capable of performing an accurate compensation function by configuring a rear sensing structure of a display panel to be movable.

According to various aspects of the present disclosure, there may be provided a display device having a higher aperture ratio and higher resolution by sensing the luminance of subpixels and compensating for the luminance deviation between the subpixels without a complex subpixel structure and a complex signal line structure.

BRIEF DESCRIPTION OF THE DRAWINGS

The above and other features and advantages of the disclosure will be more clearly understood from the following detailed description, taken in conjunction with the accompanying drawings, in which.

DETAILED DESCRIPTION

Figure 1:
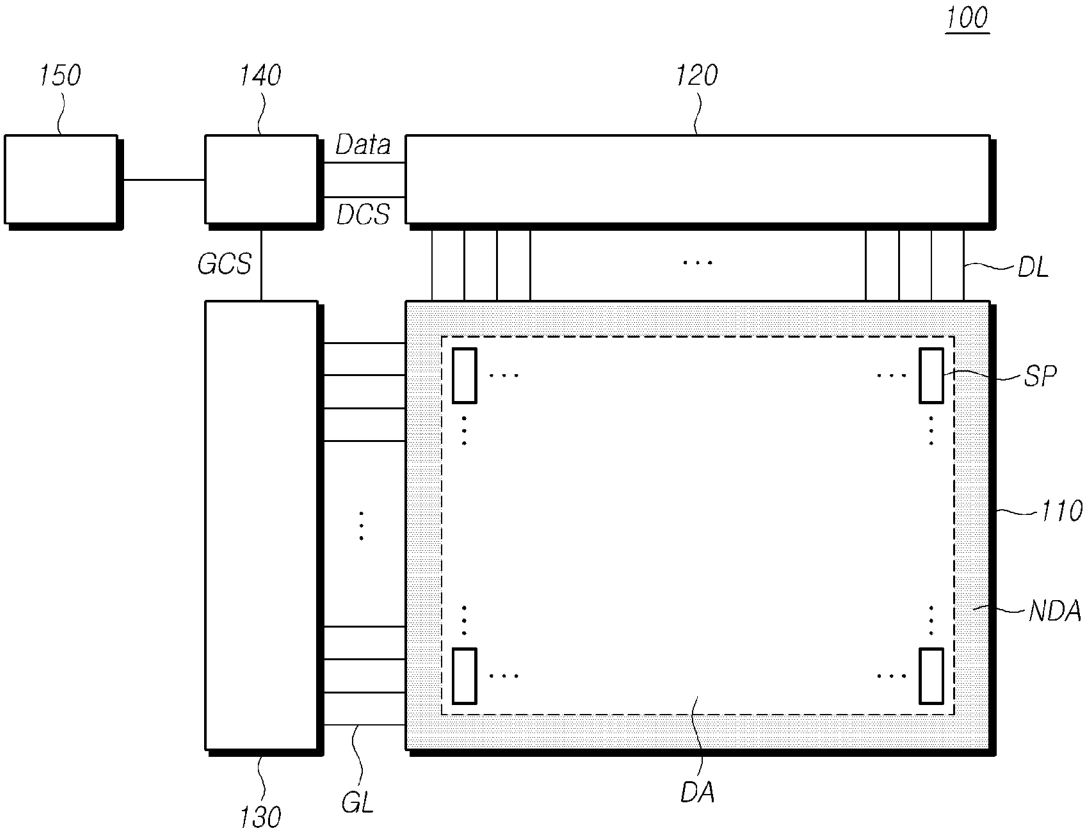
FIG. 1 is a view illustrating a system configuration of a display device according to aspects of the disclosure.

In the following description of examples or aspects of the disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the disclosure are described in detail with reference to the accompanying drawings.

FIG. 1 is a view illustrating a system configuration of a display device 100 according to aspects of the disclosure.

Referring to FIG. 1, a display device 100 according to aspects of the disclosure may include a display panel 110 and display driving circuits for driving the display panel 110. The display driving circuits may include a data driving circuit 120 and a gate driving circuit 130 and may further include a display controller 140 controlling the data driving circuit 120 and the gate driving circuit 130.

The display panel 110 may include signal lines, such as a plurality of data lines DL and a plurality of gate lines GL, and may include a plurality of subpixels SP connected with the plurality of data lines DL and the plurality of gate lines GL.

The display panel 110 may include a display area DA in which images are displayed and a non-display area NDA in which no image is displayed.

In the display area DA, signal lines, such as a plurality of data lines DL and a plurality of gate lines GL, may be disposed, and a plurality of subpixels SP for displaying an image may be disposed. In the non-display area NDA, the signal lines disposed in the display area DA may be extended and disposed, the data driving circuit 120 and/or the gate driving circuit 130 may be mounted, or pad portions to which the data driving circuit 120, gate driving circuit 130 or a printed circuit is connected may be disposed.

The data driving circuit 120 is a circuit for driving the plurality of data lines DL, and may supply data signals to the plurality of data lines DL.

The gate driving circuit 130 is a circuit for driving the plurality of gate lines GL, and may supply gate signals to the plurality of gate lines GL.

The display controller 140 may supply a data control signal DCS to the data driving circuit 120 to control the operation timing of the data driving circuit 120. The display controller 140 may supply a gate control signal GCS for controlling the operation timing of the gate driving circuit 130 to the gate driving circuit 130.

The display controller 140 may start gate driving (scanning) according to the timing implemented in each frame, convert the input image data (image signal) input from an external host module 150 into image data Data according to the data signal format used in the data driving circuit 120, supply the image data Data to the data driving circuit 120, and control data driving at an appropriate time according to the gate driving.

The display controller 140 receives, from the outside (e.g., a host system), various timing signals including a vertical synchronization signal VSYNC, a horizontal synchronization signal HSYNC, an input data enable signal DE, and a clock signal, along with the input image data (image signal).

To control the data driving circuit 120 and the gate driving circuit 130, the display controller 140 receives timing signals, such as the vertical synchronization signal VSYNC, horizontal synchronization signal HSYNC, input data enable signal DE, and clock signal CLK, generates various control signals DCS and GCS, and outputs the control signals to the data driving circuit 120 and the gate driving circuit 130.

As an example, to control the gate driving circuit 130, the display controller 140 outputs various gate control signals GCS including a gate start pulse GSP, a gate shift clock GSC, and a gate output enable signal (Gate Output Enable, GOE).

The gate start pulse GSP controls the operation start timing of one or more gate driver integrated circuits constituting each gate driving circuit 130. The gate shift clock GSC is a clock signal commonly input to one or more gate driver integrated circuits and controls the shift timing of the scan signals (gate pulses). The gate output enable signal GOE designates timing information about one or more gate driver integrated circuits.

To control the data driving circuit 120, the display controller 140 outputs various data control signals DCS including, e.g., a source start pulse SSP, a source sampling clock SSC, and a source output enable signal (Source Output Enable, SOE).

The source start pulse SSP controls the data sampling start timing of one or more source driver integrated circuits constituting the data driving circuit 120. The source sampling clock SSC is a clock signal for controlling the sampling timing of data in each source driver integrated circuit. The source output enable signal SOE controls the output timing of the data driving circuit 120.

The display controller 140 may be implemented as a separate component from the data driving circuit 120, or the controller 140, along with the data driving circuit 120, may be implemented as an integrated circuit.

The data driving circuit 120 receives the image data Data from the display controller 140 and supply data voltages to the plurality of data lines DL, thereby driving the plurality of data lines DL. The data driving circuit 120 is also referred to as a 'source driving circuit.'

The data driving circuit 120 may include one or more source driver integrated circuit (SDICs). Each source driver integrated circuit (SDIC) may include a shift register, a latch circuit, a digital-to-analog converter (DAC), and an output buffer. In some cases, each source driver integrated circuit (SDIC) may further include an analog-digital converter ADC.

For example, each source driver integrated circuit (SDIC) may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may output a gate signal of a turn-on level voltage or a gate signal of a turn-off level voltage according to the control of the display controller 140. The gate driving circuit 130 may sequentially drive the plurality of gate lines GL by sequentially supplying gate signals of the turn-on level voltage to the plurality of gate lines GL.

The gate driving circuit 130 may be connected with the display panel 110 by TAB method or connected to a bonding pad of the display panel 110 by a COG or COP method or may be connected with the display panel 110 according to a COF method. Alternatively, the gate driving circuit 130 may be formed in a gate in panel (GIP) type, in the non-display area NDA of the display panel 110.

When a specific gate line GL is opened by the gate driving circuit 130, the data driving circuit 120 may convert the image data Data received from the display controller 140 into an analog data voltage and supply it to the plurality of data lines DL.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The display controller 140 may be a timing controller used in typical display technology, or a control device that may perform other control functions as well as the functions of the timing controller.

The display controller 140 may be implemented as various circuits or electronic components, such as an integrated circuit (IC), a field programmable gate array (FPGA), an application specific integrated circuit (ASIC), or a processor.

The display controller 140 may be mounted on a printed circuit board or a flexible printed circuit and may be electrically connected with the data driving circuit 120 and the gate driving circuit 130 through the printed circuit board or the flexible printed circuit.

The display controller 140 may transmit/receive signals to/from the data driving circuit 120 according to one or more predetermined interfaces. The interface may include, e.g., a low voltage differential signaling (LVDS) interface, an EPI interface, and a serial peripheral interface (SPI). The display controller 140 may include storage, such as one or more registers.

The display device 100 according to aspects of the disclosure may be a self-luminous display, such as an organic light emitting diode (OLED) display, a quantum dot display, or a micro light emitting diode (LED) display.

When the display device 100 according to aspects of the disclosure is an OLED display, each subpixel SP may include an organic light emitting diode (OLED), which by itself emits light, as the light emitting element. When the display device 100 is a quantum dot display, each subpixel SP may include a light emitting element formed of a quantum dot, which is a self-luminous semiconductor crystal. When the display device 100 is a micro LED display, each subpixel SP may include a micro LED, which is self-emissive and formed of an inorganic material, as the light emitting element.

Figure 2:
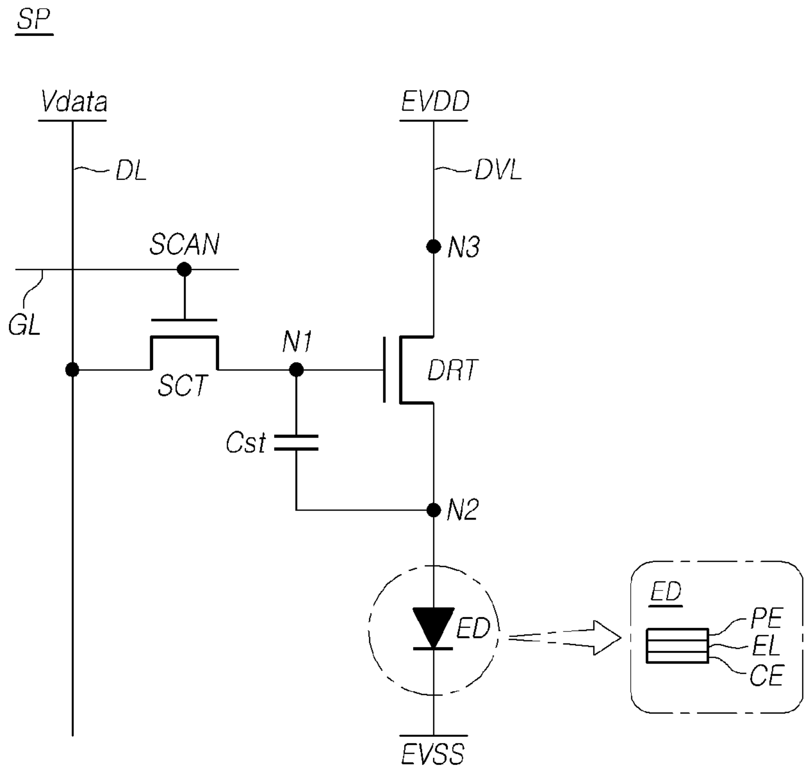
FIG. 2 is an equivalent circuit diagram illustrating a subpixel of a display device according to aspects of the disclosure.

FIG. 2 is an equivalent circuit diagram illustrating a subpixel SP of a display device 100 according to aspects of the disclosure.

Referring to FIG. 2, each of a plurality of subpixels SP disposed on a display panel 110 of a display device 100 according to aspects of the disclosure may include a light emitting element ED, a driving transistor DRT, a scan transistor SCT, and a storage capacitor Cst. If the subpixel SP includes the two transistors DRT and SCT and one capacitor Cst, the subpixel SP may be referred to as having a 2T (Transistor) 1C (Capacitor) structure.

The light emitting element ED may include a pixel electrode PE and a common electrode CE and may further include a light emitting layer EL between the pixel electrode PE and the common electrode CE. The pixel electrode PE may be an anode electrode or a cathode electrode. The common electrode CE may be a cathode electrode or an anode electrode. For example, the light emitting element ED may be an organic light emitting diode (OLED), an inorganic light emitting diode, or a quantum dot light emitting element.

The driving transistor DRT is a transistor for driving the light emitting element ED, and may include a first node N1, a second node N2, and a third node N3.

The first node N1 of the driving transistor DRT may be a gate node of the driving transistor DRT, and may be electrically connected with a source node or a drain node of the scan transistor SCT. The second node N2 of the driving transistor DRT may be a source node or a drain node of the driving transistor DRT, and may be electrically connected to the pixel electrode PE of the light emitting element ED. The third node N3 of the driving transistor DRT may be electrically connected with a driving voltage line DVL supplying a driving voltage EVDD.

The scan transistor SCT may be controlled by the scan signal SCAN and may be connected between the first node N1 of the driving transistor DRT and the data line DL. In other words, the scan transistor SCT may be turned on or off according to the scan signal SCAN supplied from the scan signal line SCL, controlling the connection between the data line DL and the first node N1 of the driving transistor DRT.

The scan transistor SCT may be turned on by the scan signal SCAN having a turn-on level voltage and transfer the data voltage Vdata supplied from the data line DL to the first node N1 of the driving transistor DRT.

Each of the driving transistor DRT and the scan transistor SCT may be an n-type transistor or a p-type transistor.

The storage capacitor Cst may be electrically connected between the first node N1 and second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP may emit light.

The storage capacitor Cst is not a parasitic capacitor (e.g., Cgs or Cgd) which is an internal capacitor existing between the gate node and the source node (or drain node) of the driving transistor DRT, but may be an external capacitor intentionally designed outside the driving transistor DRT.

The subpixel SP disposed on the display panel 110 may further include one or more transistors and, in some cases, may further include one or more capacitors.

Each of the driving transistor DRT and/or the light emitting element ED included in each of the plurality of subpixels SP disposed on the display panel 110 of the display device 100 according to aspects may have its own intrinsic characteristic value. For example, the unique characteristic values of the driving transistor DRT may include a threshold voltage and mobility. The intrinsic characteristic values of the light emitting element ED may include, e.g., a threshold voltage.

The characteristic values of the driving transistor DRT included in each of the plurality of subpixels SP may vary over the driving time. All of the plurality of subpixels SP do not have the same driving time. In other words, the driving time of some of the plurality of subpixels SP may be different from the driving time of the rest.

Accordingly, the characteristic values of the respective driving transistors DRT of the plurality of subpixels SP are not all the same. In other words, the characteristic values of the driving transistors DRT of some subpixels SP among the plurality of subpixels SP may be different from the characteristic values of the driving transistors DRT of other subpixels SP.

Due to deviations in characteristic values between the plurality of driving transistors DRT disposed on the display panel 110, luminance deviations may occur between the plurality of subpixels SP disposed on the display panel 110. Thus, a luminance non-uniformity may occur in the display panel 110.

Similar to the deviations in characteristic values between the plurality of driving transistors DRT disposed on the display panel 110, deviations in characteristic values between the plurality of light emitting elements ED disposed on the display panel 110 may also exist. Resultantly, luminance deviations may occur between the plurality of subpixels SP disposed on the display panel 110 so that a luminance non-uniformity may occur.

The conventional display device provides a compensation function for reducing the deviation in characteristic value between driving transistors DRT or deviation in characteristic value between light emitting elements ED by performing complicated sensing driving on the subpixels SP of the display panel 110 and sensing the signal lines disposed on the display panel 110 to thereby sense the characteristic values of the driving transistors DRT or light emitting elements ED.

In other words, the conventional display device necessarily needs a complicated subpixel structure and complicated signal line structure to sense the deviation in luminance between the subpixels SP, ending up with a complicated driving method for sensing the characteristic values of the subpixels SP having the complicated structure.

However, the display device 100 according to aspects of the disclosure may provide a "new concept, rear sensing-based compensation system" that eliminates the need for a complicated subpixel structure and complicated signal line structure and a complicated sensing driving method. Described below is a rear sensing-based compensation system of the display device 100 according to aspects of the disclosure.

Figure 3:
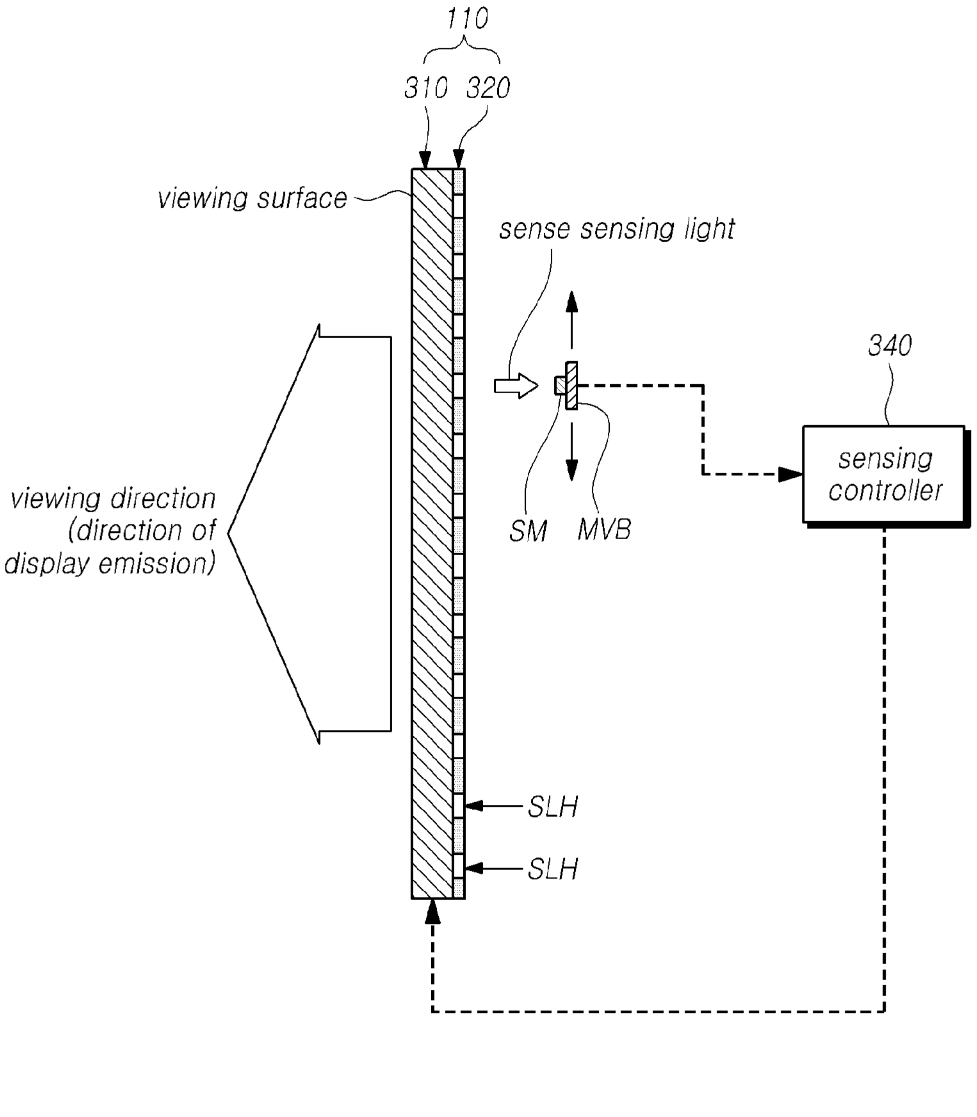
FIG. 3 schematically illustrates a rear sensing-based compensation system of a display device according to aspects of the disclosure.

FIG. 3 schematically illustrates a rear sensing-based compensation system of a display device 100 according to aspects of the disclosure.

Referring to FIG. 3, a display device 100 according to aspects of the disclosure may include a rear sensing-based compensation system capable of sensing the light emitted from the rear surface of the display panel 110, which is opposite to the viewing surface of the display panel 110, to compensate for the deviation in luminance between the subpixels SP.

In the disclosure, the light emitted from the rear surface of the display panel 110 is light for sensing purposes, and may also be referred to below as sensing light.

In the disclosure, the viewing surface of the display panel 110 is the surface that the user views and the surface where the display light is emitted, and the rear surface of the display panel 110 is the surface which is positioned opposite to the viewing surface of the display panel 110 and where the sensing light is emitted.

Referring to FIG. 3, the rear sensing-based compensation system according to aspects of the disclosure may include a display panel 110 including a plurality of light emitting elements ED and a plurality of sensing light emission holes SLH through which light is emitted to the rear surface opposite to the viewing surface, a plurality of sensor modules SM sensing the light emitted through at least one of the plurality of sensing light emission holes SLH, and a sensing controller 340 receiving a sensing value from at least one of the plurality of sensor modules SM.

Referring to FIG. 3, the rear sensing-based compensation system according to aspects of the disclosure may further include a moving bar MVB that is movable on the rear surface of the display panel 110. The plurality of sensor modules SM may be mounted on the moving bar MVB and sense the rear surface of the display panel 110.

Referring to FIG. 3, for the sensing space between the rear surface of the display panel 110 and the plurality of sensor modules SM, the moving bar MVB is slightly apart from the rear surface of the display panel 110.

The sensing controller 340 may control the movement of the moving bar MVB and may receive a sensing value from at least one of the plurality of sensor modules SM.

Referring to FIG. 3, the display panel 110 according to aspects of the disclosure may include a plurality of sensing light emission holes SLH through which sensing light is emitted to the rear surface of the display panel 110.

Referring to FIG. 3, the display panel 110 may include a display light emission path layer 310 that serves as a path through which display light is emitted to the viewing surface of the display panel 110 and a sensing light emission path layer 320 that serves as a path through which sensing light is emitted to the rear surface of the display panel 110, which is opposite to the viewing surface of the display panel 110.

Each of the display light emission path layer 310 and the sensing light emission path layer 320 may include several layers. The display light emission path layer 310 and the sensing light emission path layer 320 may be completely separated layers. Alternatively, the display light emission path layer 310 and the sensing light emission path layer 320 may partially overlap.

Referring to FIG. 3, the sensing light emission path layer 320 may include a plurality of sensing light emission holes SLH. The plurality of sensing light emission holes SLH may be through holes of the sensing light emission path layer 320.

Depending on whether the light emitting structure of the display device 100 according to aspects of the disclosure is a top-emission structure or a bottom-emission structure, the detailed stack structure of each of the display light emission path layer 310 and the sensing light emission path layer 320 may vary. This is described below in further detail with reference to FIGS. 11 to 14.

Referring to FIG. 3, a back cover may be further disposed on the rear surface of the sensing light emission path layer 320 of the display panel 110. In this case, as through holes through which the sensing light emission path layer 320 and the back cover pass together, a plurality of sensing light emission holes SLH may be formed.

The display device 100 according to aspects of the disclosure may easily and accurately identify the luminance characteristics of the subpixels SP and deviations in luminance between the subpixels SP using rear sensing elements (the moving bar MVB, the plurality of sensor modules SM, etc.).

Accordingly, the display device 100 according to aspects of the disclosure does not need a complicated subpixel structure and complicated signal line structure and a complicated sensing driving scheme to figure out the luminance characteristics (e.g., the threshold voltage and mobility of the driving transistor DRT and the threshold voltage of the light emitting element ED) of the subpixels SP.

Further, the display device 100 according to aspects of the disclosure may not need various circuit components necessary for sensing driving. For example, the display device 100 according to aspects of the disclosure may not need to include circuit components, such as a sample and hold circuit and an analog-to-digital converter.

Further, since the display device 100 according to aspects of the disclosure does not require complicated sensing driving for the subpixels SP, the subpixels SP may be designed with a simple structure (e.g., 2T1C of FIG. 2) and may thus implement a display panel 110 having a higher aperture ratio and higher resolution while simplifying the manufacturing process of the display panel 110 as much.

Figure 4:
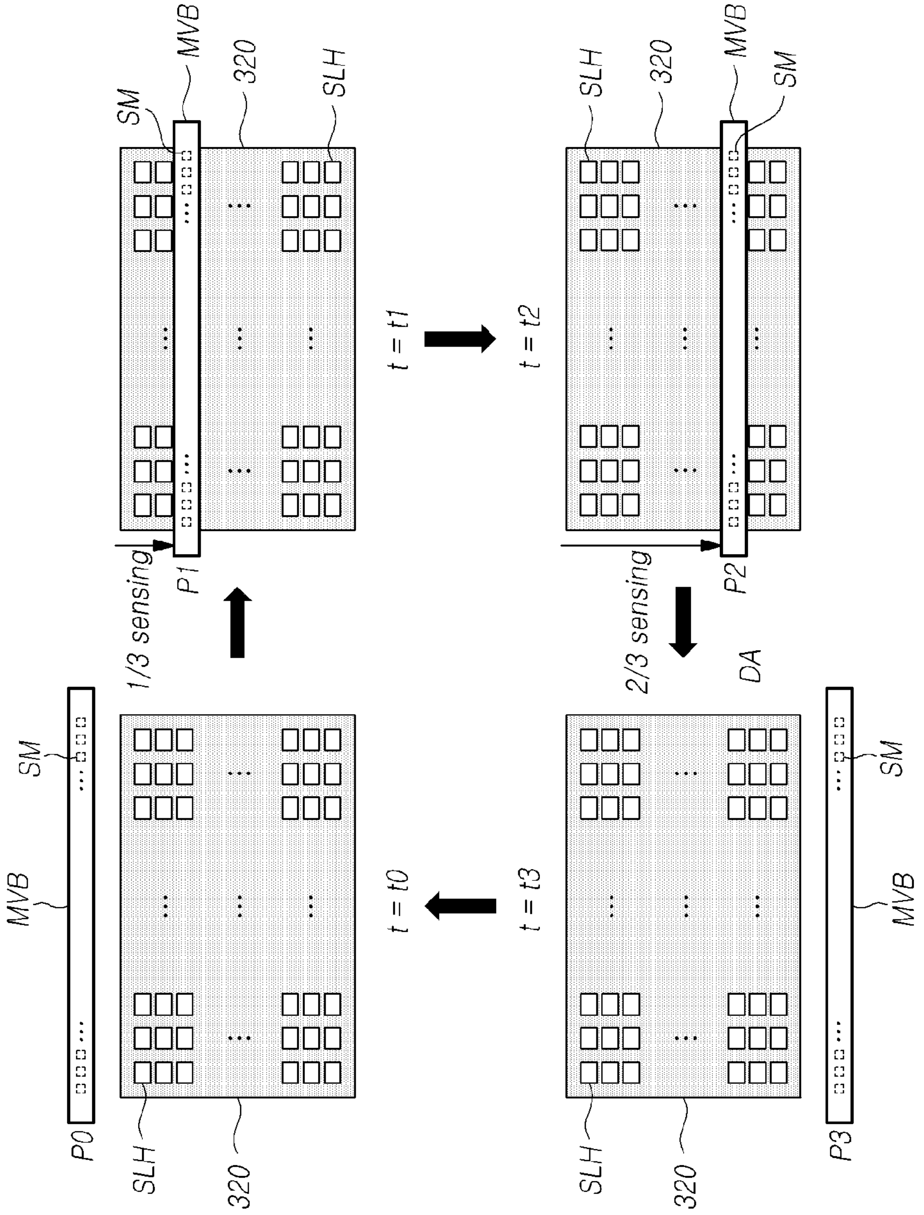
FIG. 4 illustrates a rear sensing operation of a display device according to aspects of the disclosure.

FIG. 4 illustrates a rear sensing operation of a display device 100 according to aspects of the disclosure.

Referring to FIG. 4, if the compensation timing starts, the display device 100 according to aspects of the disclosure moves the moving bar MVB while sensing the sensing light emitted through some sensing light emission holes SLH formed in the rear surface of the display panel 110, by the plurality of sensor modules SM mounted on the moving bar MVB, thereby sensing (measuring) the luminance of the plurality of subpixels SP disposed on the display panel 110.

FIG. 4 exemplarily illustrates the positions of the moving bar MVB at four times (t=t0, t1, t2, and t3). The four times (t=t0, t1, t2, and t3) may be times when the user does not view an image through the display device 100.

Referring to FIG. 4, t=t0 may mean a time before the compensation timing starts or after the compensation timing starts but before the sensing operation starts in earnest.

At t=t0, the moving bar MVB may be positioned at an initial point P0 corresponding to an upper point (or a lower point) of the rear surface of the display panel 110. In this case, the plurality of sensor modules SM mounted on the moving bar MVB do not perform a sensing operation.

After t=t0, the sensing operation may start in earnest according to the start of the compensation timing, so that the moving bar MVB may start to move downward (or upward) from the initial point P0, and the plurality of sensor modules SM mounted on the moving bar MVB may start a sensing operation.

Referring to FIG. 4, at t=t1, the moving bar MVB may be positioned at a point P1 which is ⅓ of the column-wise length of the display panel 110, down from the initial position P0.

In this case, the plurality of sensor modules SM mounted on the moving bar MVB may be in the state of having performed the sensing operation on the light (sensing light) emitted from all or some of the subpixels SP disposed in a partial display area corresponding to ⅓ of the display area DA of the display panel 110, through the sensing light emission holes SLH.

Referring to FIG. 4, at t=t2, the moving bar MVB may be positioned at a point P2 which is ⅔ of the column-wise length of the display panel 110, away from the initial position P0.

The plurality of sensor modules SM mounted on the moving bar MVB may be in the state of having performed the sensing operation on the light (sensing light) emitted from all or some of the subpixels SP disposed in a partial display area corresponding to ⅔ of the display area DA, through the sensing light emission holes SLH.

Referring to FIG. 4, at t=t3, the moving bar MVB may be positioned at a point P3 beyond the entire display area DA of the display panel 110. In this case, the plurality of sensor modules SM mounted on the moving bar MVB are in the state of having completed the sensing operation on all or some of the subpixels SP disposed in the entire display area DA.

Referring to FIG. 4, during the period between t=t0 and t=t3, the plurality of sensor modules SM mounted on the moving bar MVB may transmit the sensing values (sensing data) obtained through the sensing results on the entire display area DA to the sensing controller 340.

The sensing controller 340 may calculate the luminance of each of the plurality of subpixels SP disposed on the display panel 110 based on the sensing values received from the plurality of sensor modules SM, compare the luminance calculated for each of the plurality of subpixels SP with a reference luminance to calculate a luminance variation for each of the plurality of subpixels SP, generate compensation values capable of reducing or removing the luminance deviation of each of the plurality of subpixels SP based on the luminance variation calculated for each of the plurality of subpixels SP, and store the generated compensation values in a lookup table (LUT). The compensation value may include an offset and a gain to be used when changing the original image data (compensation processing). The compensation values are also referred to as aging compensation values of the light emitting elements ED.

The display controller 140 may change the image data by referring to the compensation LUT and supply it to the data driving circuit 120.

Referring to FIG. 4, after t=t3, the position of the moving bar MVB may be initialized. In other words, the moving bar MVB may return to the initial point P0 corresponding to the upper point of the rear surface of the display panel 110.

Figure 5A:
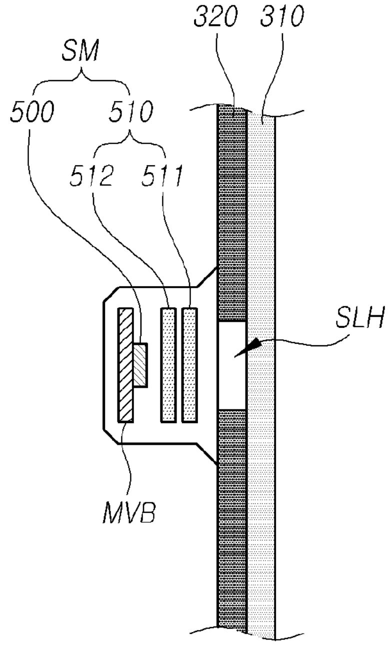
FIG. 5A is a view illustrating an example of a sensor module for rear sensing of a display device according to aspects of the disclosure.
Figure 5B:
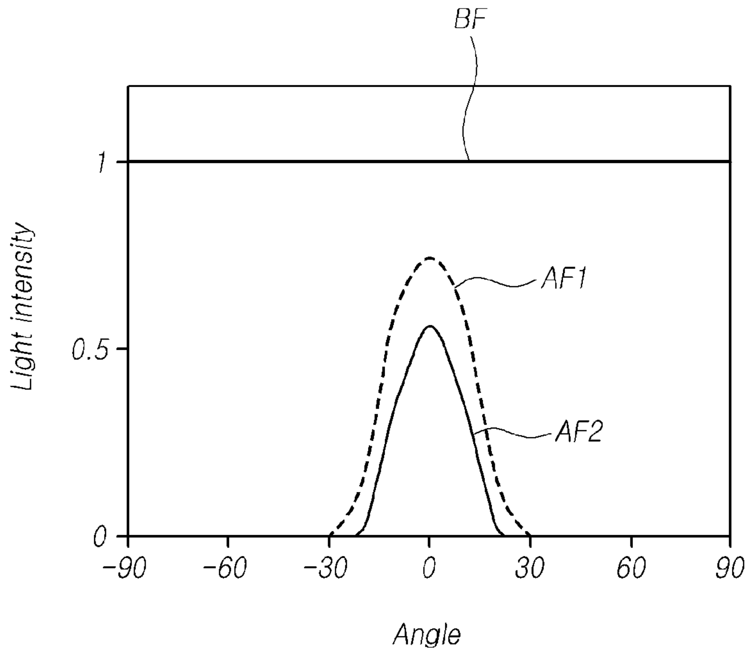
FIG. 5B is a graph illustrating a light control characteristic of a light control film included in the sensor module of FIG. 5A.

FIG. 5A illustrates an example of a sensor module SM for rear sensing of a display device 100 according to aspects of the disclosure. FIG. 5B is a graph illustrating the light control characteristics of a light control film 510 included in the sensor module SM of FIG. 5A.

Referring to FIG. 5A, each of the plurality of sensor modules SM may include a luminance sensor 500 for sensing the luminance of sensing light emitted through at least one of the plurality of sensing light emission holes SLH in the rear surface of the display panel 110 and a light controller positioned between the rear surface of the display panel 110 and the luminance sensor 500 and where the sensing light emitted through at least one sensing light emission hole SLH to the rear surface of the display panel 110 is incident, and the sensing light within a predetermined angle from the direction perpendicular to the display panel 110 is output. The light controller may be implemented in various forms, such as a film, a lens, or a filter.

Referring to FIG. 5A, the light controller may be implemented as a light control film 510. The light control film 510 of the light controller may include one or more of a first light control film 511 for filtering sensing light in a first direction and a second light control film 512 for filtering sensing light in a second direction crossing the first direction. For example, the first direction may be a horizontal direction, and the second direction may be a vertical direction. As another example, the first direction may be a vertical direction and the second direction may be a horizontal direction.

The luminance sensor 500 included in each of the plurality of sensor modules SM may be an image sensor. For example, the luminance sensor 500 may be implemented as a contact image sensor (CIS).

The light control film 510 may be a film positioned between the rear surface of the display panel 110 and the luminance sensor 500 to control the sensing light emitted through at least one of the plurality of sensing light emission holes SLH in the rear surface of the display panel 110 to be incident on the luminance sensor 500. The light control film 510 may transfer high-straightness light (sensing light) to the luminance sensor 500. Accordingly, the luminance sensor 500 may more accurately sense the luminance of the subpixel SP.

FIG. 5B is a graph illustrating the light intensity per angle (unit: degree) for each of the sensing light BF emitted to the rear surface of the display panel 110, the sensing light AF1 transmitted through a first light control film 511 and the sensing light AF2 transmitted through a second light control film 512. The angle may mean an angle between the line perpendicular to the rear surface of the display panel 110 and the sensing light.

The sensing light BF emitted through at least one sensing light emission hole SLH to the rear surface of the display panel 110 is input to the sensor module SM at all angles. The sensing light BF emitted to the rear surface of the display panel 110 passes through the first light control film 511 in the sensor module SM. For example, the sensing light AF1 passing through the first light control film 511 has only a component within an angle of about ±30 degrees in the first direction.

The sensing light AF1 passing through the first light control film 511 passes through the second light control film 512 in the sensor module SM. For example, the sensing light AF2 passing through the second light control film 512 has only a component within an angle of about ±20 degrees in the second direction.

If the sensing light BF emitted from the rear surface of the display panel 110 passes through the first light control film 511 and the second light control film 512, straightness increases. Accordingly, the luminance sensor 500 may more accurately sense the luminance of the subpixel SP.

Figure 6A:
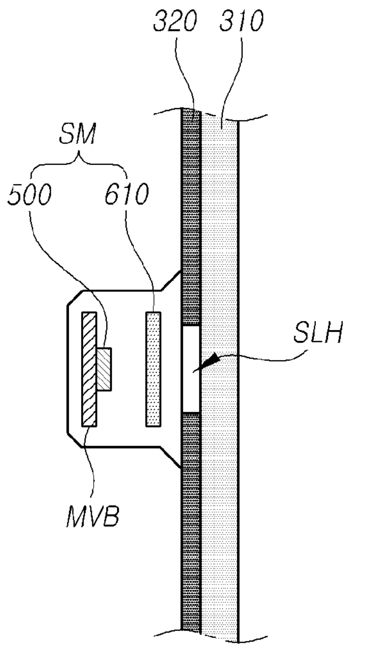
FIG. 6A is a view illustrating another example of a sensor module for rear sensing of a display device according to aspects of the disclosure.
Figure 6B:
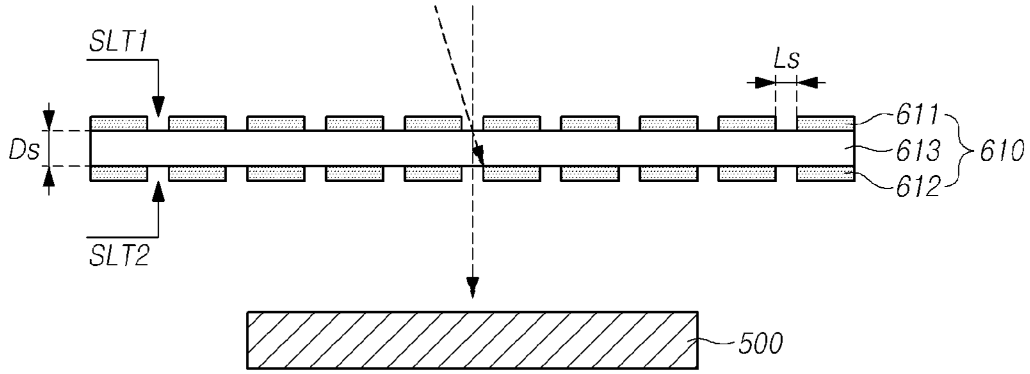
FIG. 6B is a view illustrating an optical filter included in the sensor module of FIG. 6A.

FIG. 6A illustrates another example of a sensor module SM for rear sensing of a display device 100 according to aspects of the disclosure. FIG. 6B is a view illustrating an optical filter 610 included in the sensor module SM of FIG. 6A.

Referring to FIG. 6A, each of the plurality of sensor modules SM may include a luminance sensor 500 for sensing the sensing light emitted through at least one sensing light emission hole SLH to the rear surface of the display panel 110 and a light controller positioned between the rear surface of the display panel 110 and the luminance sensor 500 and where the sensing light emitted through at least one sensing light emission hole SLH to the rear surface of the display panel 110 is incident, and the sensing light within a predetermined angle from the direction perpendicular to the display panel 110 is output.

Referring to FIG. 6B, the light controller may include an optical filter 610 including a transmissive layer 613 and a non-transmissive layer.

Referring to FIG. 6B, the non-transmissive layer of the optical filter 610 may include one or more of a front non-transmissive layer 611 and a rear non-transmissive layer 612. The front non-transmissive layer 611 may be positioned on the front surface of the transmissive layer 613 and may include a plurality of first slits SLT1 formed to be spaced apart from each other by a predetermined first interval Ls. The rear non-transmissive layer 612 may be positioned on the rear surface of the transmissive layer 613 and may include a plurality of second slits SLT2 formed to be spaced apart from each other by a predetermined second interval Ls. The first interval Ls of the plurality of first slits SLT1 and the second interval Ls of the plurality of second slits SLT2 may be the same or different.

The plurality of first slits SLT1 and the plurality of second slits SLT2 may be formed in directions crossing each other. For example, each of the plurality of first slits SLT1 may be formed in a horizontal direction, and each of the plurality of second slits SLT2 may be formed in a vertical direction. Each of the plurality of second slits SLT2 may be formed in a horizontal direction, and each of the plurality of first slits SLT1 may be formed in a vertical direction.

The optical filter 610 may be a slit filter positioned between the rear surface of the display panel 110 and the luminance sensor 500 to filter only high-straightness sensing light among the sensing light emitted through at least one sensing light emission hole SLH to the rear surface of the display panel 110 and input it to the luminance sensor 500 and may transfer high-straightness sensing light to the luminance sensor 500. Accordingly, the luminance sensor 500 may more accurately sense the luminance of the subpixel SP.

Referring to FIG. 6B, the tangent value (tan θ) of the angle θ between the line perpendicular to the rear surface of the display panel 110 and the sensing light may be the value (Ls/Ds) ($\tan\theta = Ls/Ds$) obtained by dividing the slit interval Ls by the thickness Ds of the transmission layer 163. However, it is assumed that the first interval Ls of the plurality of first slits SLT1 and the second interval Ls of the plurality of second slits SLT2 are the same. If the first interval Ls of the plurality of first slits SLT1 and the second interval Ls of the plurality of second slits SLT2 are different from each other, the minimum value of the first interval Ls of the plurality of first slits SLT1 and the second interval Ls of the plurality of second slits SLT2 may be applied to the above equation ($\tan\theta = Ls/Ds$).

Referring to FIG. 6B, the angle θ formed between the line perpendicular to the rear surface of the display panel 110 and the sensing light should have a value within a preset angle (±θth, e.g., about 30 degrees) so that the sensing light travels straight for sensing accuracy of the sensor module SM. Therefore, the slit interval Ls and the thickness Ds of the transmissive layer 163 should be designed so that the value Ls/Ds obtained by dividing the slit interval Ls by the thickness Ds of the transmissive layer 163 is in a range from $\tan(+\theta th)$ to $\tan(-\theta th)$.

FIGS. 7A, 7B, 8A, 8B, 9A, 9B, 10A, and 10B are views illustrating examples of a sensing light emission structure formed in a display panel 110 for rear sensing of a display device 100 according to aspects of the disclosure.

Referring to FIGS. 7A, 7B, 8A, 8B, 9A, 9B, 10A, and 10B, a plurality of sensing light emission holes SLH, SLH_R, SLH_V, SLH_H, and SLH_D may be formed in the sensing light emission path layer 320 of the display panel 110. The plurality of sensing light emission holes SLH may be through holes of the sensing light emission path layer 320.

Referring to FIGS. 7A, 7B, 8A, 8B, 9A, 9B, 10A, and 10B, the light emitted from the light emitting element ED in the subpixel SP may be emitted through the sensing light emission holes SLH, SLH_R, SLH_V, SLH_H, and SLH_D in the direction opposite to the viewing surface.

Referring to FIGS. 7A, 7B, 8A, 8B, 9A, 9B, 10A, and 10B, each of the plurality of sensing light emission holes SLH, SLH_R, SLH_V, SLH_H, and SLH_D may overlap at least three sensor modules SM. Alternatively, each of the plurality of sensing light emission holes SLH, SLH_R, SLH_V, SLH_H, and SLH_D may overlap one sensor module SM or may overlap at least two sensor modules SM.

Figure 7A:
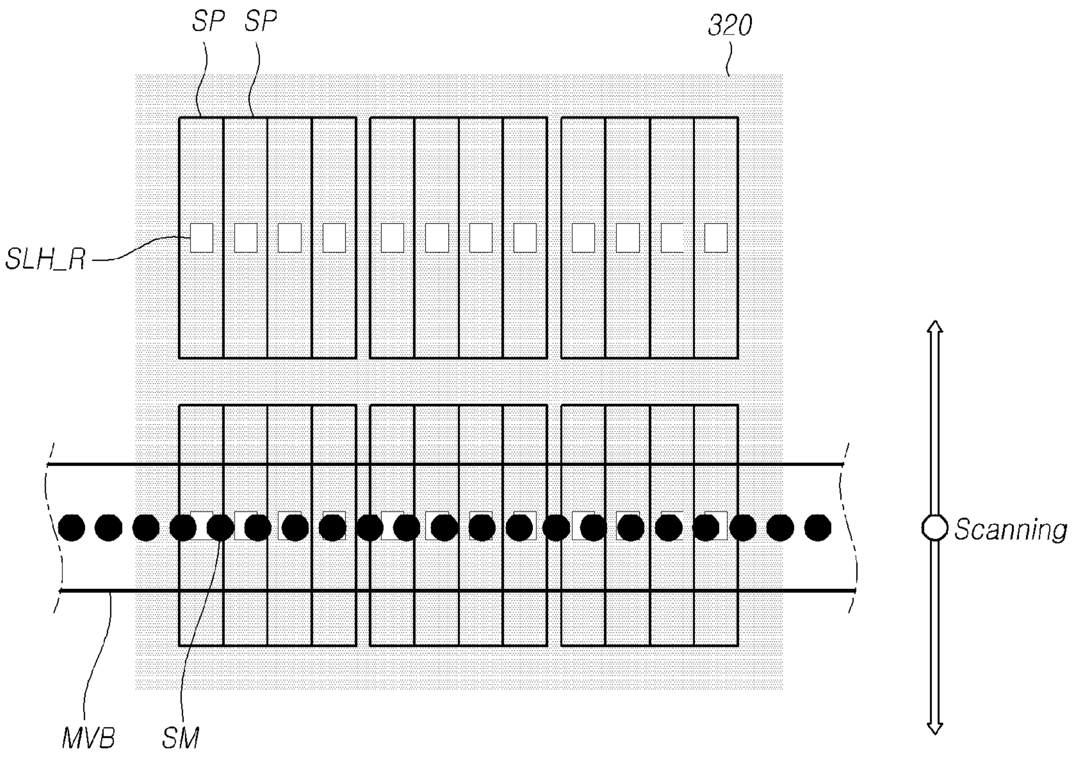
FIGS. 7A, 7B, 8A, 8B, 9A, 9B, 10A, and 10B are views illustrating examples of a sensing light emission structure formed in a display panel for rear sensing of a display device according to aspects of the disclosure.

Referring to FIG. 7A, the plurality of sensing light emission holes SLH_R may be disposed, one for each subpixel SP. In other words, one sensing light emission hole SLH_R may be positioned corresponding to the emission area of one subpixel SP.

Figure 7B:
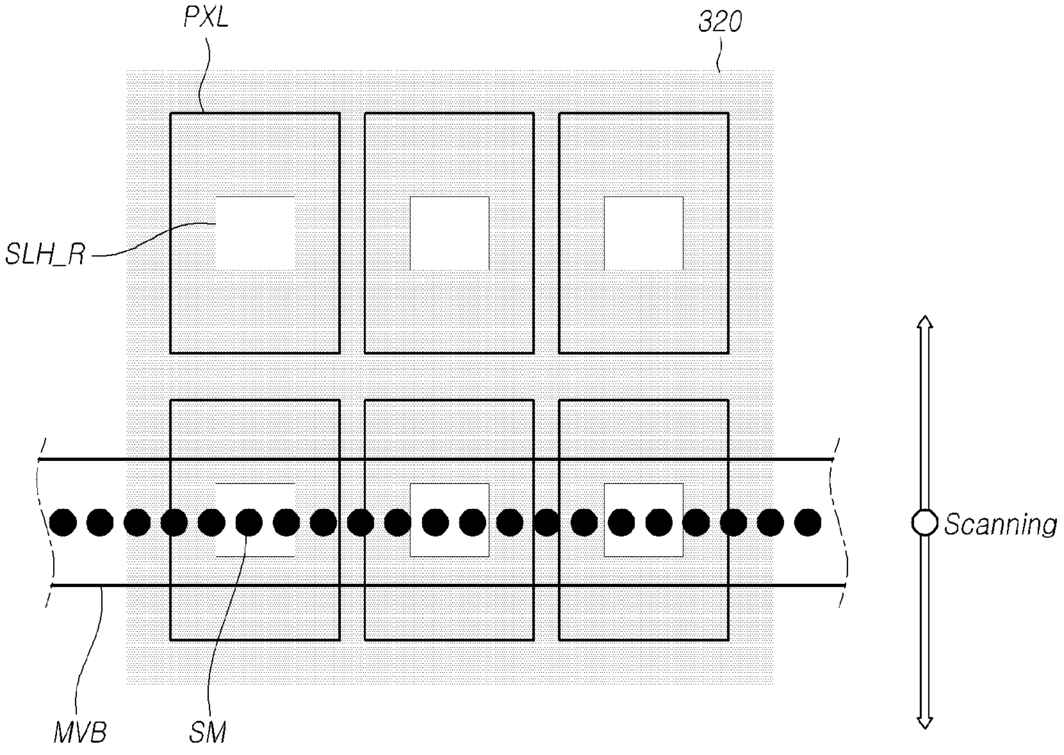

Referring to FIG. 7B, the plurality of sensing light emission holes SLH_R may be disposed, one for each pixel PXL. For example, one pixel PXL may include two or more subpixels SP. In other words, one sensing light emission hole SLH_R may be positioned corresponding to the emission areas of two or more subpixels SP.

For example, when one pixel PXL includes four subpixels SP, one sensing light emission hole SLH_R may be positioned corresponding to the emission areas of four subpixels SP. The four subpixels SP may include a red subpixel, a blue subpixel, a white subpixel, and a green subpixel.

As shown in FIG. 7A, when one sensing light emission hole SLH_R is positioned corresponding to the emission area of one subpixel SP, it is possible to perform sensing on more subpixels SP. Accordingly, more precise sensing and compensation of the subpixels SP may be possible.

As shown in FIGS. 7A and 7B, each of the plurality of sensing light emission holes SLH_R may have a rectangular shape.

Figure 8A:
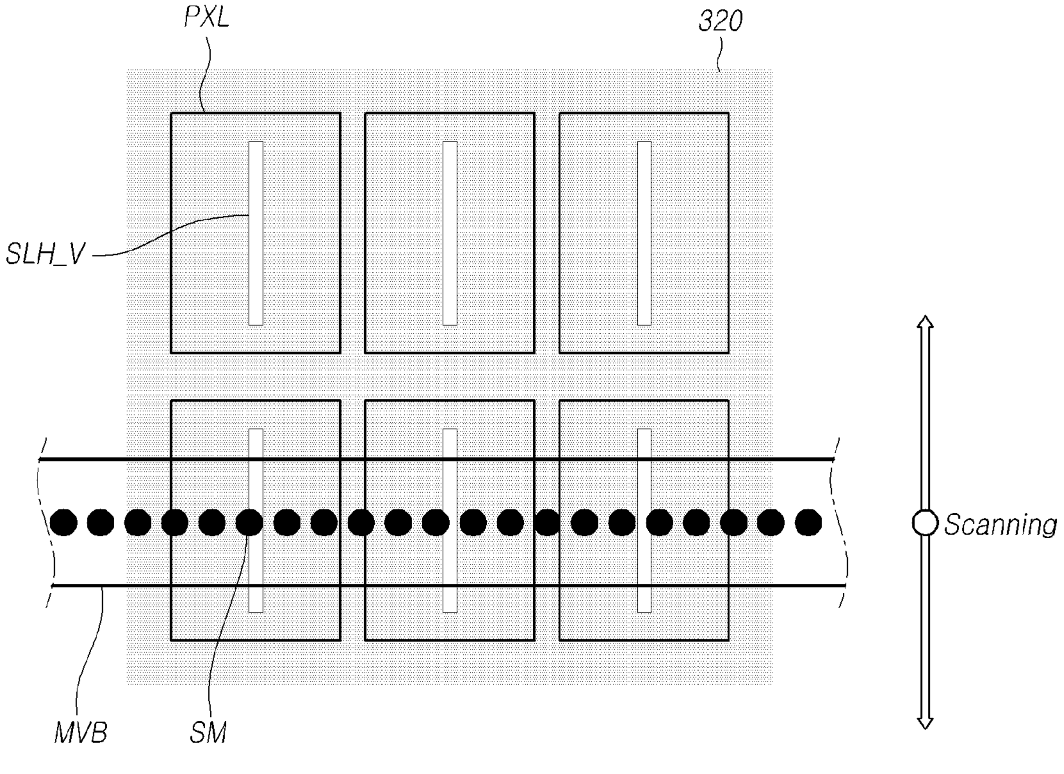

As shown in FIG. 8A, each of the plurality of sensing light emission holes SLH_V may have a vertical line shape. When the shape or size of the emission area of the subpixel SP is varied in the vertical direction, if the sensing light emission hole SLH_V has a vertical line shape, the sensing light generated from the subpixel SP may be normally emitted without blockage through the vertical line-shaped sensing light emission hole SLH_V. Accordingly, more precise sensing and compensation of the subpixels SP may be possible.

Figure 8B:
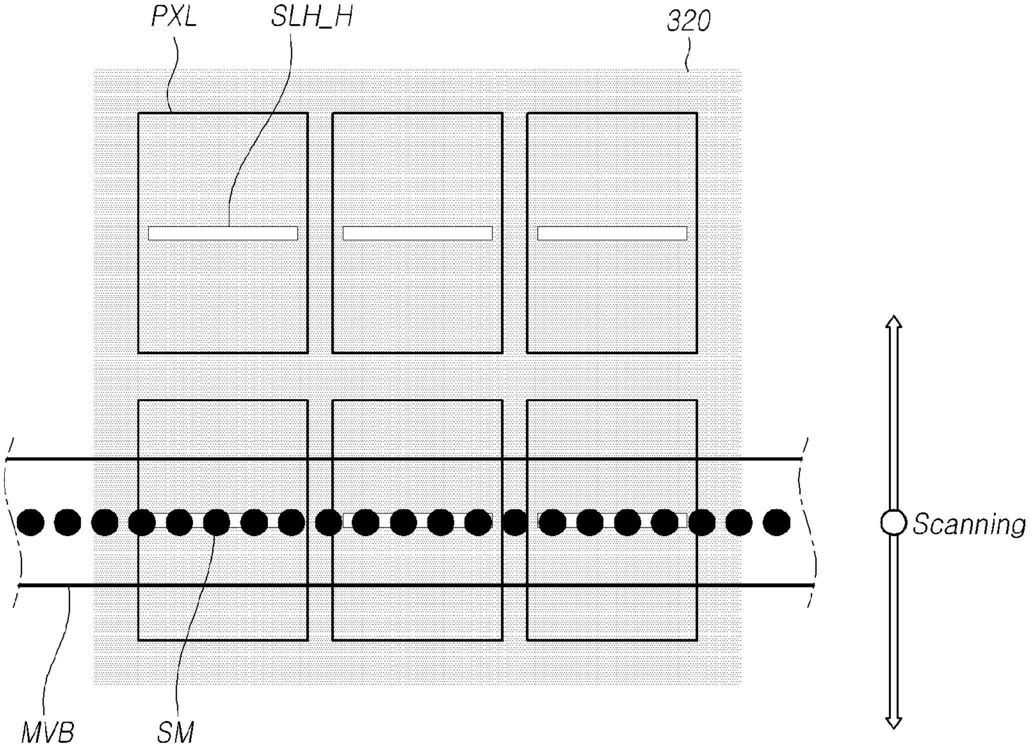

As shown in FIG. 8B, each of the plurality of sensing light emission holes SLH_H may have a horizontal line shape. When the shape or size of the emission area of the subpixel SP is varied in the horizontal direction, if the sensing light emission hole SLH_H has a horizontal line shape, the sensing light generated from the subpixel SP may be normally emitted without blockage through the horizontal line-shaped sensing light emission hole SLH_H. Accordingly, more precise sensing and compensation of the subpixels SP may be possible.

Figure 9A:
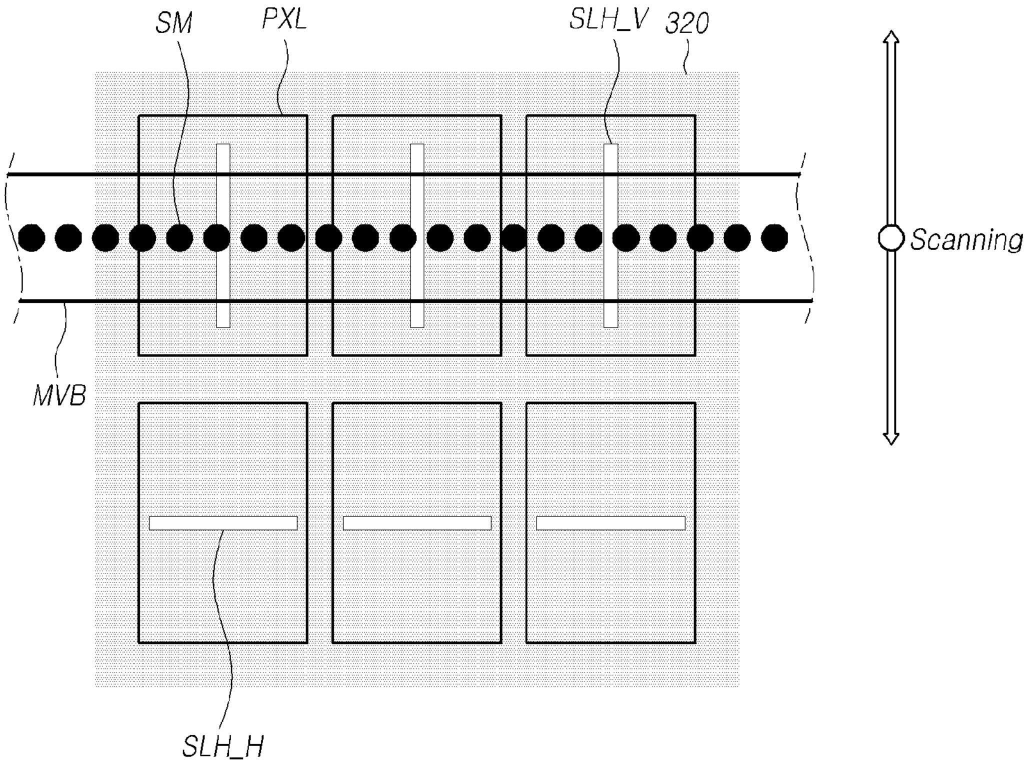
Figure 9B:
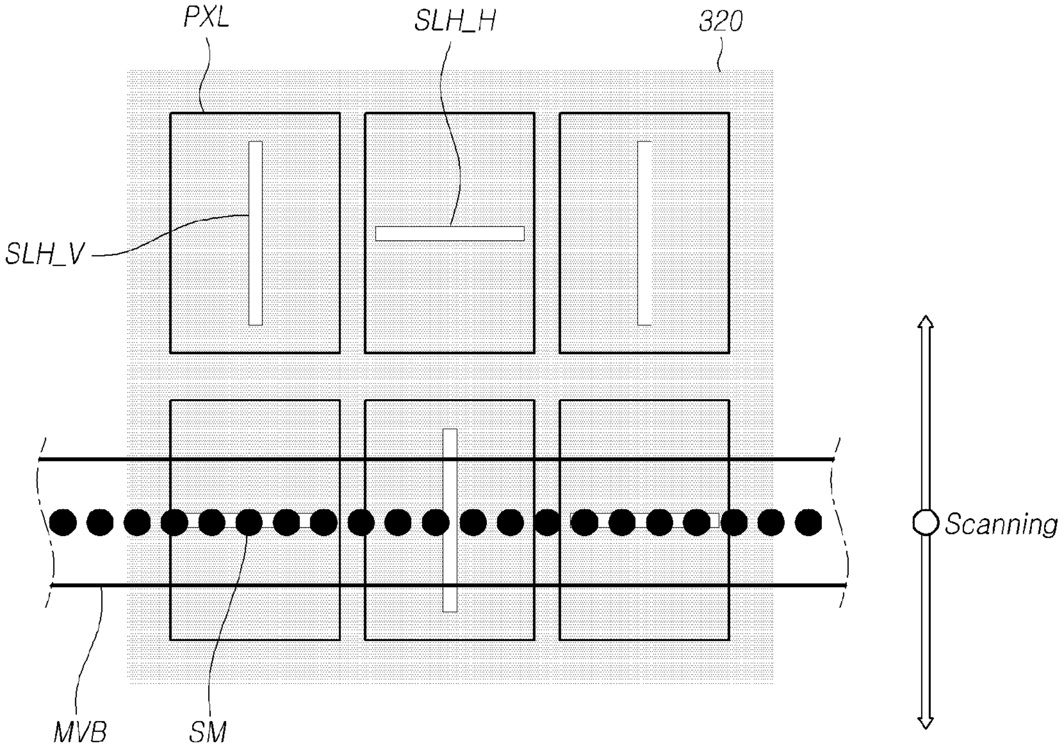

Referring to FIGS. 9A and 9B, the plurality of sensing light emission holes SLH may include a plurality of horizontal line-shaped sensing light emission holes SLH_H and a plurality of vertical line-shaped sensing light emission holes SLH_V. The plurality of horizontal line-shaped sensing light emission holes SLH_H and the plurality of vertical line-shaped sensing light emission holes SLH_V may be alternately disposed.

Referring to FIG. 9A, only the plurality of horizontal line-shaped sensing light emission holes SLH_H may be disposed in the same pixel row (or the same subpixel row), and only the plurality of vertical line-shaped sensing light emission holes SLH_V may be disposed in another same pixel row (or same subpixel row).

Referring to FIG. 9A, the plurality of horizontal line-shaped sensing light emission holes SLH_H and the plurality of vertical line-shaped sensing light emission holes SLH_V may be alternately disposed in the same pixel column (or same subpixel column).

Referring to FIG. 9B, the plurality of horizontal line-shaped sensing light emission holes SLH_H and the plurality of vertical line-shaped sensing light emission holes SLH_V may be alternately disposed in the same pixel row (or same subpixel row).

Referring to FIG. 9B, the plurality of horizontal line-shaped sensing light emission holes SLH_H and the plurality of vertical line-shaped sensing light emission holes SLH_V may be alternately disposed in the same pixel column (or same subpixel column).

Referring to FIGS. 9A and 9B, when both the plurality of horizontal line-shaped sensing light emission holes SLH_H and the plurality of vertical line-shaped sensing light emission holes SLH_V exist, more precise sensing and compensation may be possible regardless of the subpixel structure and process deviation.

Referring to FIGS. 9A and 9B, when both the plurality of horizontal line-shaped sensing light emission holes SLH_H and the plurality of vertical line-shaped sensing light emission holes SLH_V exist, the number of sensor modules SM overlapping the plurality of sensing light emission holes SLH may increase. Accordingly, more precise sensing and compensation of the subpixels SP may be possible.

Figure 10A:
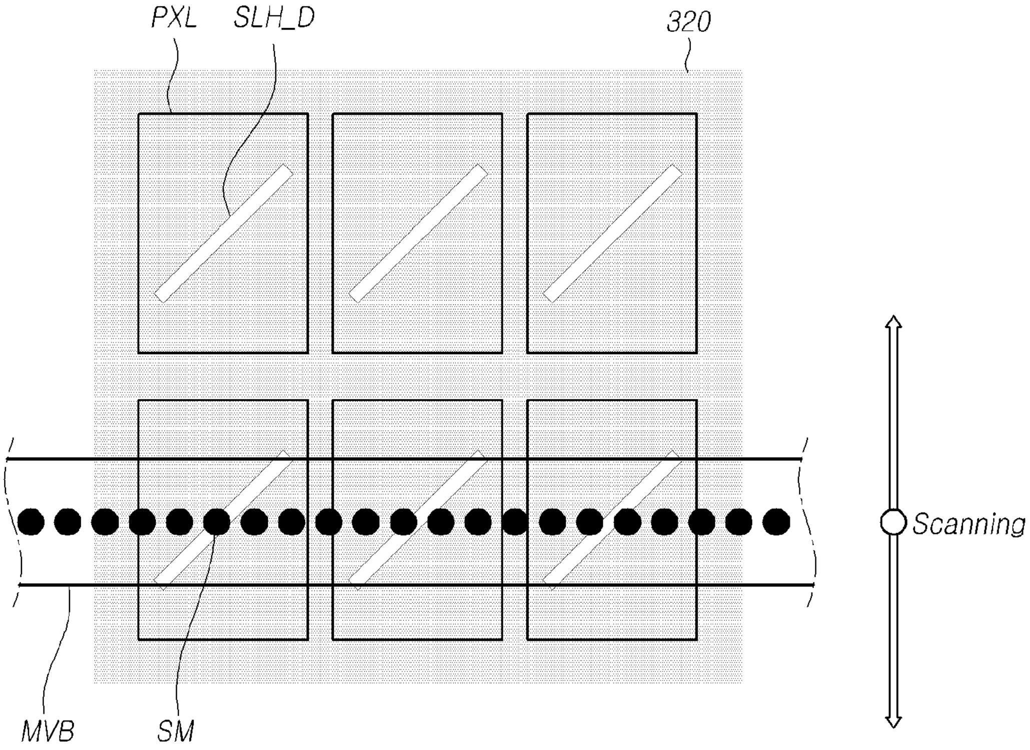
Figure 10B:
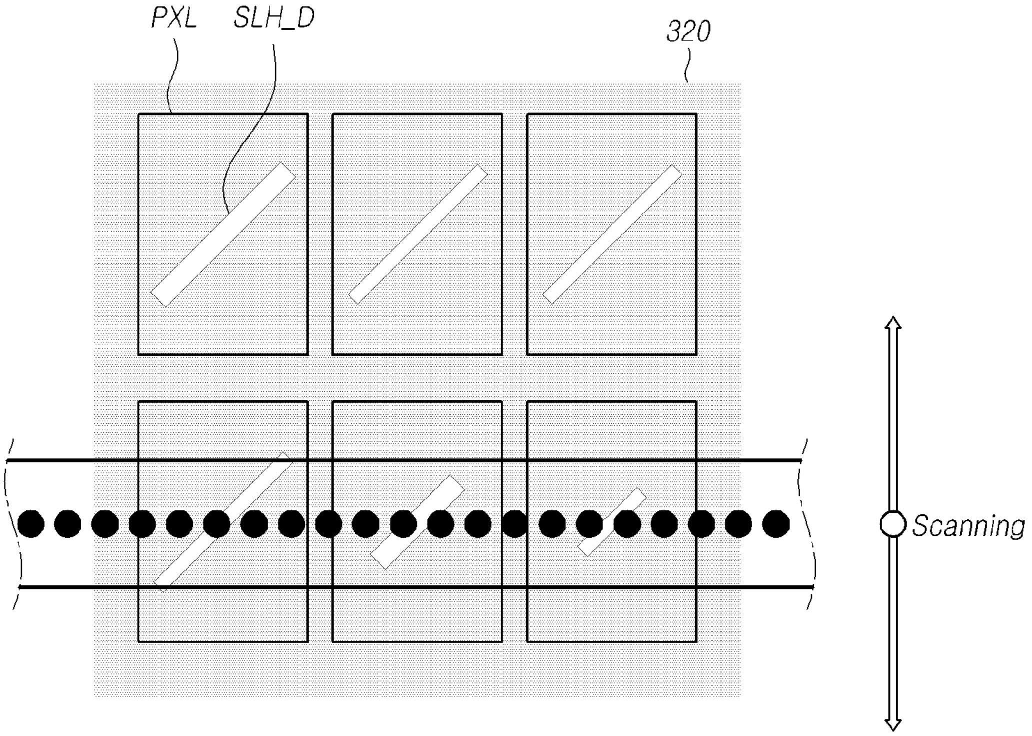

Referring to FIGS. 10A and 10B, each of the plurality of sensing light emission holes SLH_D may have a diagonal line shape.

When the shape or size of the emission area of the subpixel SP is varied in both the vertical direction and horizontal direction, if the sensing light emission hole SLH_D has a diagonal line shape, the sensing light generated from the subpixel SP may be normally emitted without blockage through the diagonal line-shaped sensing light emission hole SLH_D.

As shown in FIGS. 10A and 10B, when a plurality of diagonal line-shaped sensing light emission holes SLH_D exist, the number of sensor modules SM overlapping one sensing light emission hole SLH_D and arranged in the horizontal direction may increase regardless of the subpixel structure and process deviation. Accordingly, more precise sensing and compensation of the subpixels SP may be possible.

Each of the plurality of sensing light emission holes SLH_D in FIG. 10A has a diagonal line shape but may have the same size. In contrast, each of the plurality of sensing light emission holes SLH_D in FIG. 10B may have a different size.

Figure 11:
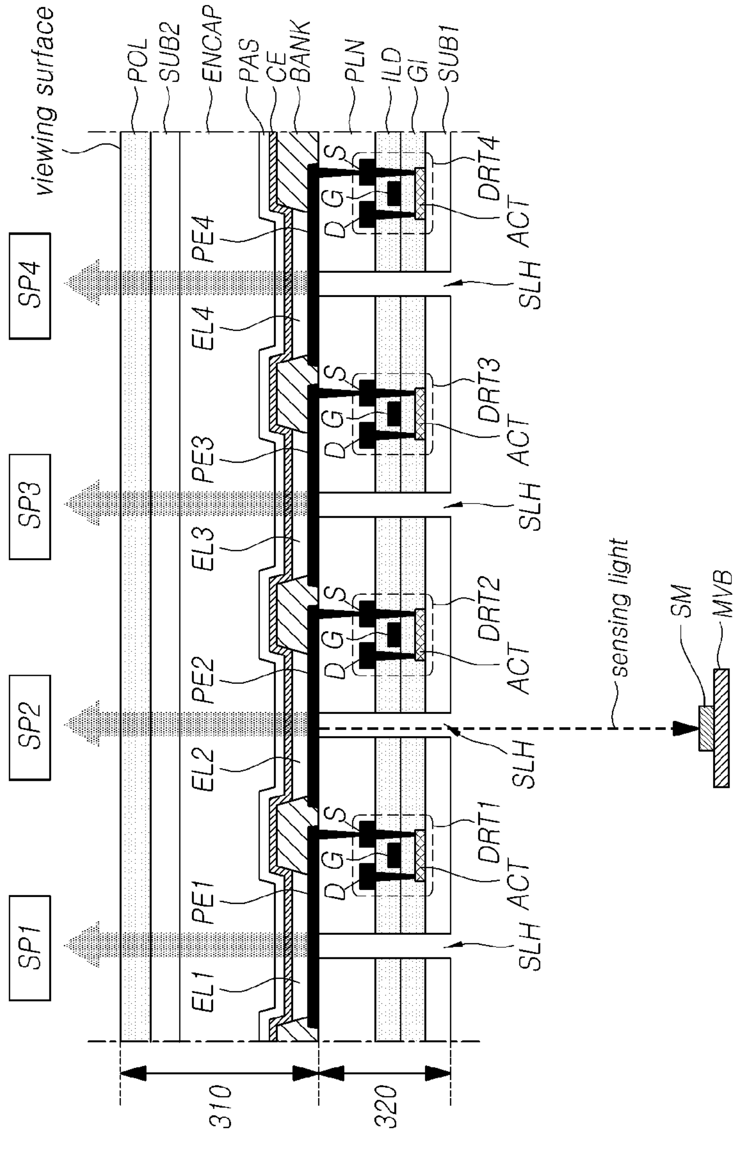
FIGS. 11 and 12 are cross-sectional views illustrating a display panel including a sensing light emission structure when a display device according to aspects of the disclosure has a top-emission structure.
Figure 12:
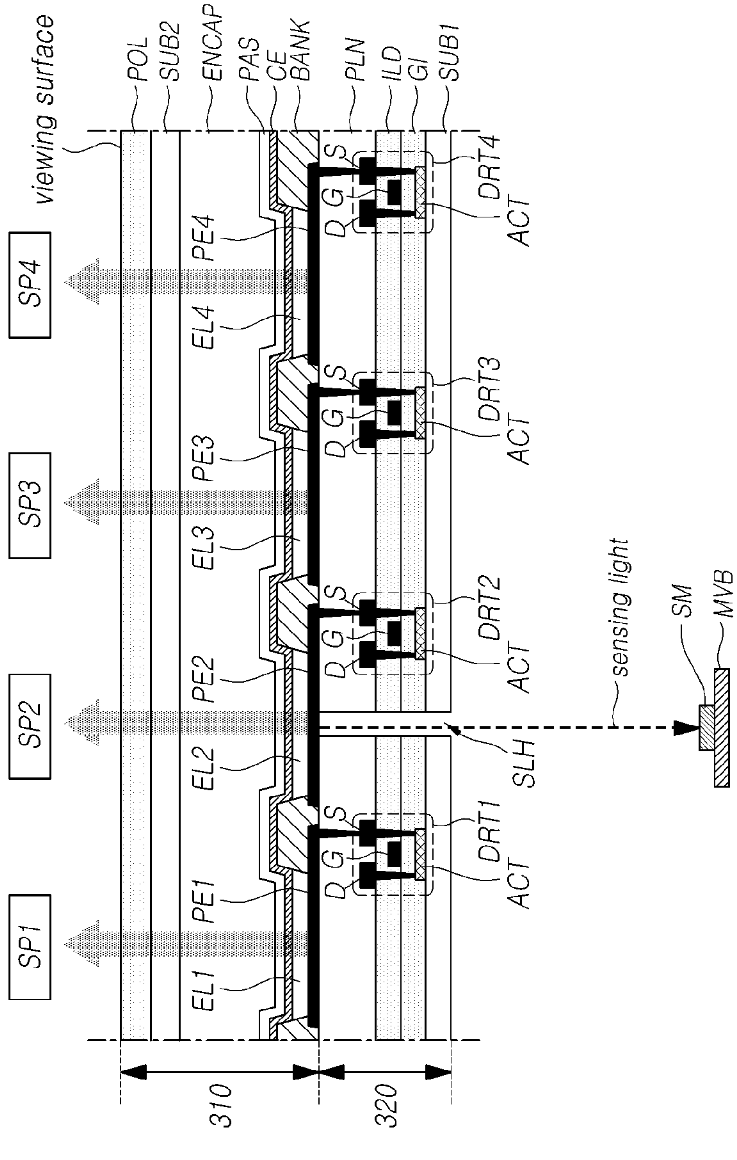

FIGS. 11 and 12 are cross-sectional views illustrating a display panel 110 including a sensing light emission structure when a display device 100 according to aspects of the disclosure has a top-emission structure. However, the direction facing the viewing surface is denoted as "up" and the direction opposite to the viewing surface is denoted as "down".

Referring to FIGS. 11 and 12, to describe the vertical structure of the display panel 110 including the sensing light emission structure in the display device 100 having the top-emission structure, first to fourth subpixels SP1, SP2, SP3, and SP4 included in one pixel PXL are taken as an example.

Referring to FIGS. 11 and 12, the first subpixel SP1 may include a first driving transistor DRT1, a first pixel electrode PE1, and a first light emitting layer EL1. The second subpixel SP2 may include a second driving transistor DRT2, a second pixel electrode PE2, and a second light emitting layer EL2. The third subpixel SP3 may include a third driving transistor DRT3, a third pixel electrode PE3, and a third light emitting layer EL3. The fourth subpixel SP4 may include a fourth driving transistor DRT4, a fourth pixel electrode PE4, and a fourth light emitting layer EL4.

The display panel 110 may include first to fourth pixel electrodes PE1, PE2, PE3, and PE4, first to fourth light emitting layers EL1, EL2, EL3, and EL4 respectively disposed on the first to fourth pixel electrodes PE1, PE2, PE3, and PE4, a common electrode CE positioned on the first to fourth light emitting layers EL1, EL2, EL3, and EL4, and an encapsulation layer ENCAP positioned on the common electrode CE.

The display panel 110 may include first to fourth driving transistors DRT1, DRT2, DRT3, and DRT4 respectively connected to the first to fourth pixel electrodes PE1, PE2, PE3, and PE4.

Referring to FIGS. 11 and 12, the first to fourth driving transistors DRT1, DRT2, DRT3, and DRT4 may be disposed on a first substrate SUB1 and be positioned below the first to fourth pixel electrodes PE1, PE2, PE3 and PE4. In other words, the first to fourth driving transistors DRT1, DRT2, DRT3, and DRT4 may be positioned under the respective light emitting elements ED of the first to fourth subpixels SP1, SP2, SP3 and SP4.

The vertical structure is described below in more detail with reference to FIGS. 11 and 12. The terms "upward" and "downward" are distinguished in terms of the order in which the layers are stacked. In other words, the direction from the first substrate SUB1 to the second substrate SUB2 is denoted as upward.

The active layer ACT of each of the first to fourth driving transistors DRT1, DRT2, DRT3, and DRT4 may be disposed on the first substrate SUB1.

A gate insulation film GI may be disposed on the active layer ACT of each of the first to fourth driving transistors DRT1, DRT2, DRT3, and DRT4.

A gate electrode G of each of the first to fourth driving transistors DRT1, DRT2, DRT3, and DRT4 may be disposed on the gate insulation film GI, and an inter-layer insulation film ILD may be disposed thereon.

A source electrode S and a drain electrode D of each of the first to fourth driving transistors DRT1, DRT2, DRT3, and DRT4 may be disposed on the inter-layer insulation film (ILD), and a planarization layer PLN may be disposed thereon.

First to fourth pixel electrodes PE1, PE2, PE3, and PE4 may be disposed on the planarization layer PLN. The first to fourth pixel electrodes PE1, PE2, PE3, and PE4 may be electrically connected with the respective source electrodes S of the first to fourth driving transistors DRT1, DRT2, DRT3, and DRT4 by through holes in the planarization layer PLN.

A bank BANK may be disposed to cover a portion of each of the first to fourth pixel electrodes PE1, PE2, PE3, and PE4. The bank BANK may include first to fourth openings, and the first to fourth openings may correspond to the emission areas of the first to fourth subpixels SP1, SP2, SP3, and SP4.

First to fourth light emitting layers EL1, EL2, EL3, and EL4 may be disposed on the first to fourth pixel electrodes PE1, PE2, PE3, and PE4 exposed through the first to fourth openings, respectively, of the bank BANK.

A common electrode CE may be disposed on the first to fourth light emitting layers EL1, EL2, EL3, and EL4, a passivation layer PAS may be disposed on the common electrode CE, and an encapsulation layer ENCAP may be disposed thereon. The passivation layer PAS may also be a part of the encapsulation layer ENCAP. A second substrate SUB2 may be disposed on the encapsulation layer ENCAP, and a polarization plate POL may be disposed on the second substrate SUB2.

Referring to FIGS. 11 and 12, since the display panel 110 has a top-emission structure, display light may be emitted from the first to fourth pixel electrodes PE1, PE2, PE3 and PE4 to the second substrate SUB2.

Referring to FIGS. 11 and 12, since the display panel 110 has a top-emission structure, the first to fourth pixel electrodes PE1, PE2, PE3, and PE4 may be formed of a reflective metal, and the common electrode CE may be formed of a transparent metal.

Referring to FIGS. 11 and 12, since the display panel 110 has a top-emission structure, the display light emission path layer 310 of the display panel 110 may be formed from the first to fourth pixel electrodes PE1, PE2, PE3, and PE4 through the encapsulation layer ENCAP to the polarization plate POL.

Referring to FIGS. 11 and 12, the sensing light emission path layer 320 may be formed from the common electrode CE through the first to fourth driving transistors DRT1, DRT2, DRT3, and DRT4 to the first substrate SUB1. When a back cover is further disposed under the first substrate SUB1, the sensing light emission path layer 320 may further include the back cover.

Referring to FIGS. 11 and 12, the plurality of sensing light emission holes SLH may pass through the plurality of insulation layers PLN, ILD, and GI positioned under the first to fourth pixel electrodes PE1, PE2, PE3, and PE4.

Referring to FIGS. 11 and 12, each of the plurality of sensing light emission holes SLH may be positioned between the plurality of driving transistors DRT1, DRT2, DRT3, and DRT4. In other words, when the display panel 110 has a top-emission structure, sensing light may pass between the plurality of driving transistors DRT1, DRT2, DRT3, and DRT4.

Referring to FIG. 11, one sensing light emission hole SLH may be disposed in each of the first to fourth subpixels SP1, SP2, SP3, and SP4.

Referring to FIG. 12, one sensing light emission hole SLH may be disposed in one subpixel (e.g., SP2) among the first to fourth subpixels SP1, SP2, SP3, and SP4. When one pixel PXL includes the first to fourth subpixels SP1, SP2, SP3, and SP4, one sensing light emission hole SLH may be disposed in each pixel PXL.

Figure 13:
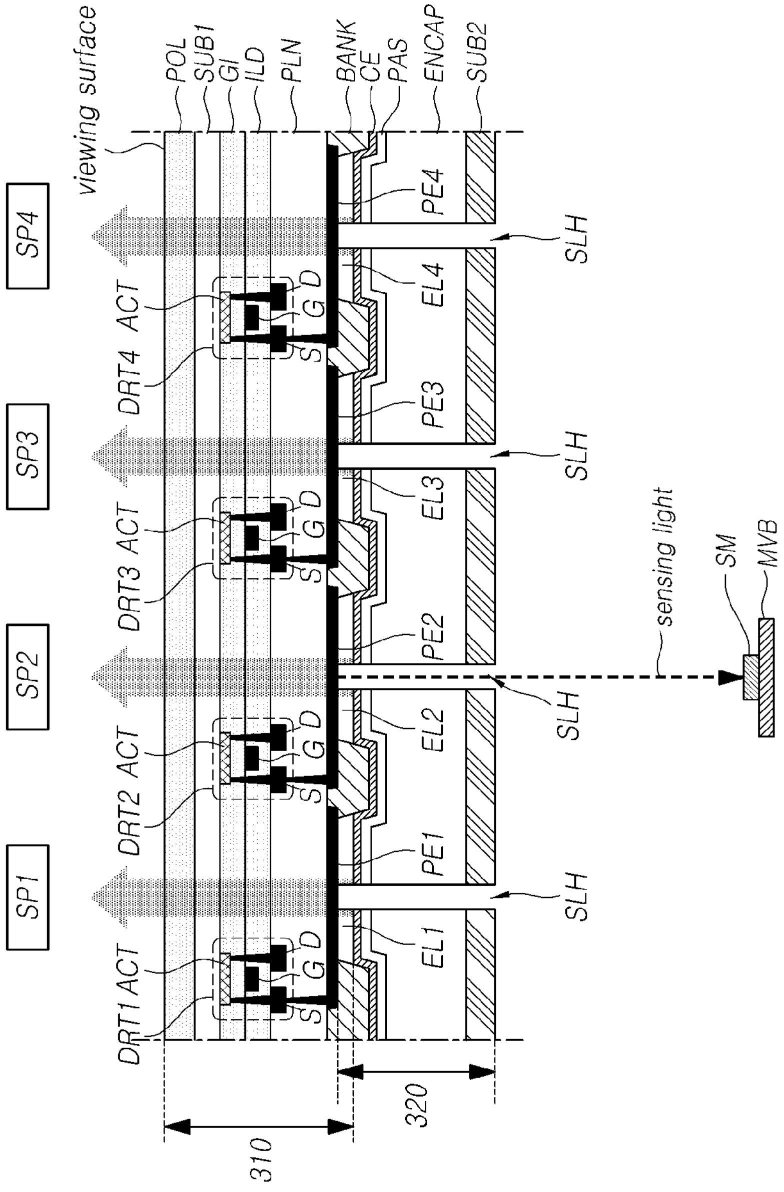
FIGS. 13 and 14 are cross-sectional views illustrating a display panel including a sensing light emission structure when a display device according to aspects of the disclosure has a bottom-emission structure.
Figure 14:
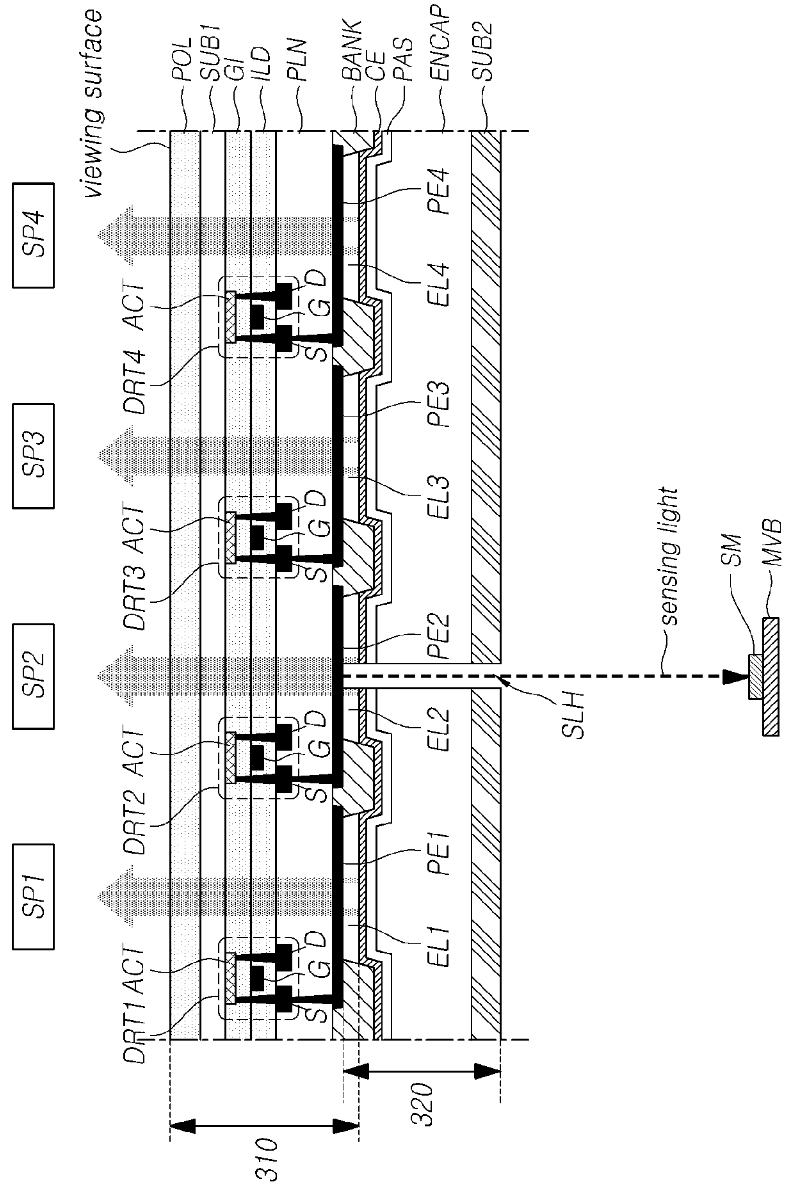

FIGS. 13 and 14 are cross-sectional views illustrating a display panel 110 including a sensing light emission structure when a display device 100 according to aspects of the disclosure has a bottom-emission structure. However, the direction facing the viewing surface is denoted as "up" and the direction opposite to the viewing surface is denoted as "down".

Referring to FIGS. 13 and 14, to describe the vertical structure of the display panel 110 including the sensing light emission structure in the display device 100 having the bottom-emission structure, first to fourth subpixels SP1, SP2, SP3, and SP4 included in one pixel PXL are taken as an example.

Referring to FIGS. 13 and 14, the first subpixel SP1 may include a first driving transistor DRT1, a first pixel electrode PE1, and a first light emitting layer EL1. The second subpixel SP2 may include a second driving transistor DRT2, a second pixel electrode PE2, and a second light emitting layer EL2. The third subpixel SP3 may include a third driving transistor DRT3, a third pixel electrode PE3, and a third light emitting layer EL3. The fourth subpixel SP4 may include a fourth driving transistor DRT4, a fourth pixel electrode PE4, and a fourth light emitting layer EL4.

Referring to FIGS. 13 and 14, the display panel 110 may include first to fourth pixel electrodes PE1, PE2, PE3, and PE4, first to fourth light emitting layers EL1, EL2, EL3, and EL4 respectively disposed under the first to fourth pixel electrodes PE1, PE2, PE3, and PE4, a common electrode CE positioned under the first to fourth light emitting layers EL1, EL2, EL3, and EL4, and an encapsulation layer ENCAP positioned under the common electrode CE.

Referring to FIGS. 13 and 14, the display panel 110 may include first to fourth driving transistors DRT1, DRT2, DRT3, and DRT4 respectively connected to the first to fourth pixel electrodes PE1, PE2, PE3, and PE4.

Referring to FIGS. 13 and 14, the first to fourth driving transistors DRT1, DRT2, DRT3, and DRT4 may be positioned above the first to fourth pixel electrodes PE1, PE2, PE3 and PE4 and be positioned under the first substrate SUB1. In other words, the first to fourth driving transistors DRT1, DRT2, DRT3, and DRT4 may be positioned above the respective light emitting elements ED of the first to fourth subpixels SP1, SP2, SP3 and SP4.

Referring to FIGS. 13 and 14, the stacking order of the display panel 110 having a bottom-emission structure is substantially the same as the stacking order of the display panel 110 having a top-emission structure.

Referring to FIGS. 13 and 14, the display panel 110 having the bottom-emission structure may have a shape in which the display panel 110 having the top-emission structure is turned upside down. The display light emission direction in the bottom-emission display panel 110 and the display light emission direction in the top-emission display panel 110 are opposite to each other.

Referring to FIGS. 13 and 14, in the bottom-emission display panel 110, the display light is emitted through the first substrate SUB1, so that the polarization plate POL is disposed outside the first substrate SUB1, which makes a slight difference.

Referring to FIGS. 13 and 14, in the bottom-emission display panel 110, display light may pass between the first to fourth driving transistors DRT1, DRT2, DRT3, and DRT4.

Referring to FIGS. 13 and 14, since the display panel 110 has a bottom-emission structure, the display light emission path layer 310 of the display panel 110 may be formed from the common electrode CE through the first to fourth driving transistors DRT1, DRT2, DRT3, and DRT4 to the polarization plate POL.

Referring to FIGS. 13 and 14, the sensing light emission path layer 320 may be formed from the first to fourth pixel electrodes PE1, PE2, PE3, and PE4 through the encapsulation layer ENCAP to the second substrate SUB2. When a back cover is further disposed under the second substrate SUB2, the sensing light emission path layer 320 may further include the back cover.

Referring to FIGS. 13 and 14, in the bottom-emission display panel 110, the first to fourth pixel electrodes PE1, PE2, PE3, and PE4 may be formed of a transparent metal, and the common electrode CE may be formed of a reflective metal.

Referring to FIGS. 13 and 14, in the bottom-emission display panel 110, the plurality of sensing light emission holes SLH may pass through the second substrate SUB2. In some cases, the plurality of sensing light emission holes SLH may further include a penetrated portion of the common electrode CE or may further include a penetrated portion of the encapsulation layer ENCAP. Alternatively, the plurality of sensing light emitting holes SLH may further include penetrated portions of the first to fourth light emitting layers EL1, EL2, EL3, and EL4.

For example, each sensing light emission hole SLH may include only a penetrated portion of the second substrate SUB2 corresponding to the back cover. Accordingly, the sensing light emission path through which the emitted sensing light reaches the sensor module SM may include a portion in which the sensing light emission hole SLH is formed and a portion in which the sensing light emission hole SLH is not formed. For example, in the sensing light emission path, the portion in which the sensing light emission hole SLH is not formed may include one or more of the light emitting layers EL1, EL2, EL3, and EL4, the common electrode CE, and the encapsulation layer ENCAP. For example, in the sensing light emission path, the portion in which the sensing light emission hole SLH is not formed may be formed of a material having high transmittance as compared to other insulation layers or other metals.

As described above, when the sensing light emission hole SLH is formed only in a portion of the sensing light emission path, the intensity of the sensing light may be attenuated in the portion where the sensing light emission hole SLH is not formed. Since the attenuation of the intensity of the sensing light is due to the vertical structure of the panel, when the vertical structure of the panel is determined, the attenuation rate of the sensing light in the portion where the sensing light emission hole SLH is not formed may be determined. The display device 100 may previously store the sensing light attenuation rate at which the intensity of the sensing light is attenuated in the sensing light path. The sensing controller 340 may correct the sensing value or luminance value received from the sensor module SM based on a previously stored sensing light attenuation rate and perform a predetermined subsequent process using the corrected sensing value or luminance value.

Referring to FIG. 13, one sensing light emission hole SLH may be disposed in each of the first to fourth subpixels SP1, SP2, SP3, and SP4.

Referring to FIG. 14, one sensing light emission hole SLH may be disposed in one subpixel (e.g., SP2) among the first to fourth subpixels SP1, SP2, SP3, and SP4. When one pixel PXL includes the first to fourth subpixels SP1, SP2, SP3, and SP4, one sensing light emission hole SLH may be disposed in each pixel PXL.

Figure 15:
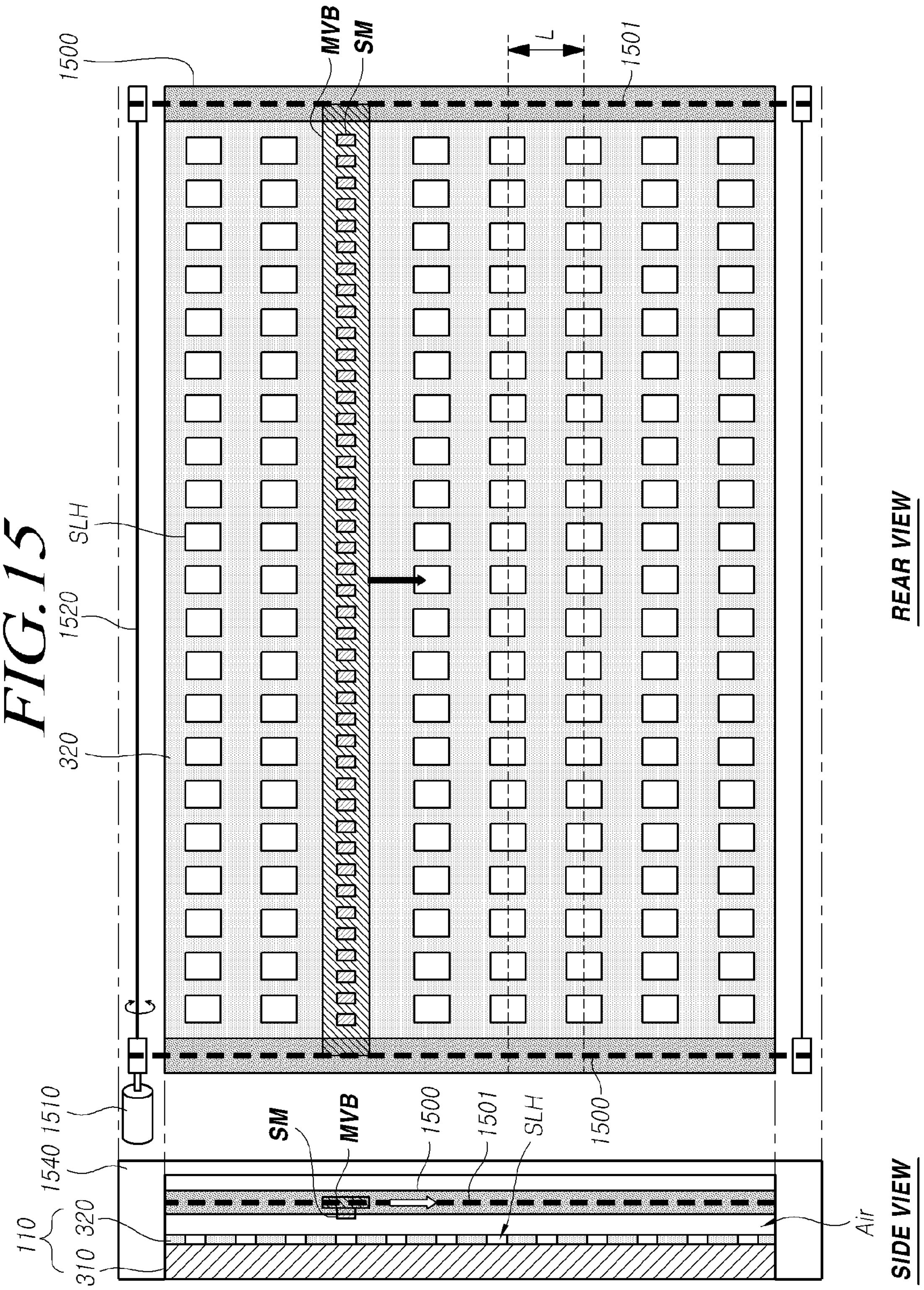
FIG. 15 illustrates a moving structure of a moving bar for rear sensing of a display device according to aspects of the disclosure.

FIG. 15 illustrates a moving structure of a moving bar MVB for rear sensing of a display device 100 according to aspects of the disclosure.

Referring to FIG. 15, the display device 100 according to aspects of the disclosure may include a movable rear sensor coupling device for mounting and moving a moving bar MVB with a plurality of sensor modules SM for rear sensing mounted thereon.

Referring to FIG. 15, the movable rear sensor coupling device may include a moving guide device 1500 including a scanning rail 1501 moving together with the moving bar MVB and a motor 1510 for rotating a rotation shaft 1520 on which the scanning rail 1501 is wound or unwound.

Referring to FIG. 15, while the rear sensing operation is in progress, the rotation shaft 1520 may be rotated clockwise (or counterclockwise) by the motor 1510. As the rotation shaft 1520 rotates, the scanning rail 1501 also rotates clockwise. The moving bar MVB may be moved downward according to the rotation of the scanning rail 1501.

Referring to FIG. 15, after the rear sensing operation is completed or while the rear sensing position is searched for, the rotation shaft 1520 may be rotated counterclockwise (or clockwise) by the motor 1510. As the rotation shaft 1520 rotates, the scanning rail 1501 also rotates counterclockwise. The moving bar MVB may be moved upward according to the rotation of the scanning rail 1501.

Referring to FIG. 15, the moving distance of the moving bar MVB may correspond to an integer multiple (e.g., L, 2L, 3L, or 4L) of the inter-center distance L between the sensing light emission holes SLH adjacent in the vertical direction.

When the rear sensing operation for all subpixel rows is performed, the moving distance of the moving bar MVB may correspond to the inter-center distance L between the sensing light emission holes SLH adjacent in the vertical direction.

When the rear sensing operation for odd-numbered subpixel rows is performed, the moving distance of the moving bar MVB may correspond to twice the inter-center distance L between the sensing light emission holes SLH adjacent in the vertical direction.

Figure 16:
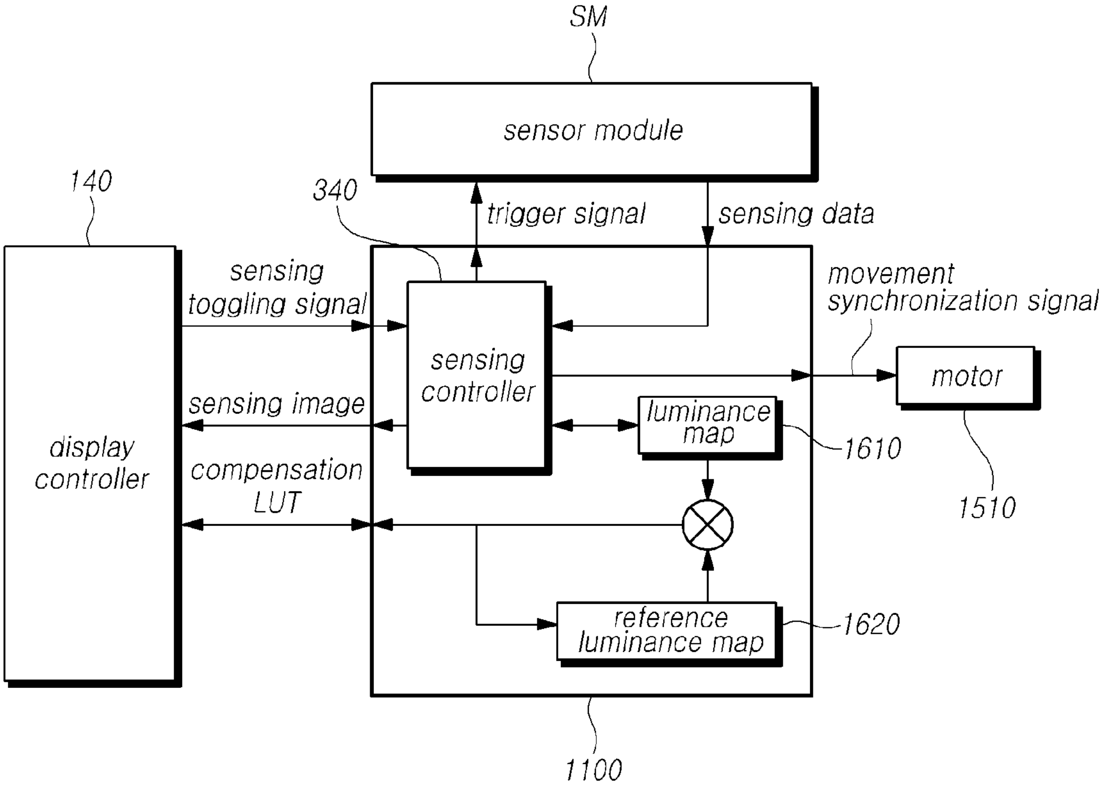
FIG. 16 illustrates, in detail, a rear sensing-based compensation system of a display device according to aspects of the disclosure.

FIG. 16 is a view illustrating a rear sensing-based compensation system of a display device 100 according to aspects of the disclosure.

Referring to FIG. 16, a rear sensing-based compensation system of a display device 100 according to aspects of the disclosure may include a plurality of sensor modules SM, a motor 1510, a sensing controller 340, and a display controller 140.

The plurality of sensor modules SM may be disposed on the moving bar MVB.

The motor 1510 may provide power to move the moving bar MVB.

The sensing controller 340 is a device that overall controls the sensing and compensation functions using the movable rear sensor structure, and may control the sensing operation of each of the plurality of sensor modules SM, control the movement of the moving bar MVB, and may control whether to rotate the motor 1510, the rotation direction, or the rotation speed.

The sensing controller 340 may be disposed on the printed circuit board 110.

For example, when the plurality of sensor modules SM are implemented as contact image sensors CIS, the sensing controller 340 and the plurality of sensor modules SM may communicate with each other through a camera link standard.

The sensing controller 340 and the display controller 140 may communicate through an inter-integrated circuit (I2C) communication interface or a serial-parallel interface (SPI).

The display controller 140 may output a sensing toggling signal indicating a sensing time to the sensing controller 340.

Upon receiving a sensing toggling signal, the sensing controller 340 may control the motor 1510 and the plurality of sensor modules SM so that a sensing operation may proceed and, upon sensing, may control to display a sensing image on the display panel 110.

The sensing controller 340 may control to display the sensing image on the whole or part of the display area DA of the display panel 110 and provide the sensing image to the display controller 140.

When the sensing image is displayed while moving according to the movement of the moving bar MVB, the sensing controller 340 may provide position information about the moving bar MVB or panel position information (e.g., subpixel information) corresponding to the position of the moving bar MVB to the display controller 140.

Accordingly, the display controller 140 may control the gate driving circuit 130 and the data driving circuit 120 so that the sensing image is displayed in the area synchronized with the position of the moving bar MVB.

The sensing controller 340 may control one or more of the rotation speed and rotation direction of the motor 1510 and thereby control one or more of the moving speed and the moving direction of the moving bar MVB.

The moving speed of the moving bar MVB needs to be precisely controlled considering the sensing speed of the plurality of sensor modules SM and layout information about the subpixels SP (e.g., the size and interval of the subpixels SP). Accordingly, the sensing controller 340 may output a movement synchronization signal to the motor 1510.

Whenever a sensing operation of the plurality of sensor modules SM is required, the sensing controller 340 may output a trigger signal for triggering the sensing operation of the plurality of sensor modules SM to the plurality of sensor modules SM.

When each of the plurality of sensor modules SM is a contact image sensor CIS, the time during which the plurality of sensor modules SM are exposed to the sensing light may be adjusted by a trigger signal. In other words, the sensing controller 340 may control the light exposure time of each of the plurality of sensor modules SM through the trigger signal.

The sensing controller 340 may control the moving speed of the moving bar MVB based on the output period of the trigger signal.

Each of the plurality of sensor modules SM may perform the sensing operation by the trigger signal to sense the luminance of the sensing light and transmit the sensing value (sensing data) for the luminance to the sensing controller 340 in a wired or wireless scheme.

The sensing controller 340 may receive the sensing value for luminance from each of the plurality of sensor modules SM, generate a compensation value based on the sensing value received from each of the plurality of sensor modules SM, and store the generated compensation value in a memory or a compensation lookup table (LUT). Specifically, the sensing controller 340 may receive the sensing value (sensing data) for luminance from each of the plurality of sensor modules SM and may generate a luminance map (luminance distribution data) 1610 based on the sensing value received from each of the plurality of sensor modules SM. The sensing controller 340 may compare the luminance map (luminance distribution data) 1610 generated through the sensing results with a pre-stored reference luminance map (reference luminance distribution data) 1620 to grasp a variation in the luminance of each of the plurality of subpixels SP, calculate a compensation value capable of reducing or removing the deviation in luminance between the plurality of subpixels SP, store the calculated compensation value (information) in the compensation LUT or change the information (compensation value) pre-stored in the compensation LUT. The reference luminance map (reference luminance distribution data) 1620 may be data stored in the compensation LUT.

Figure 17A:
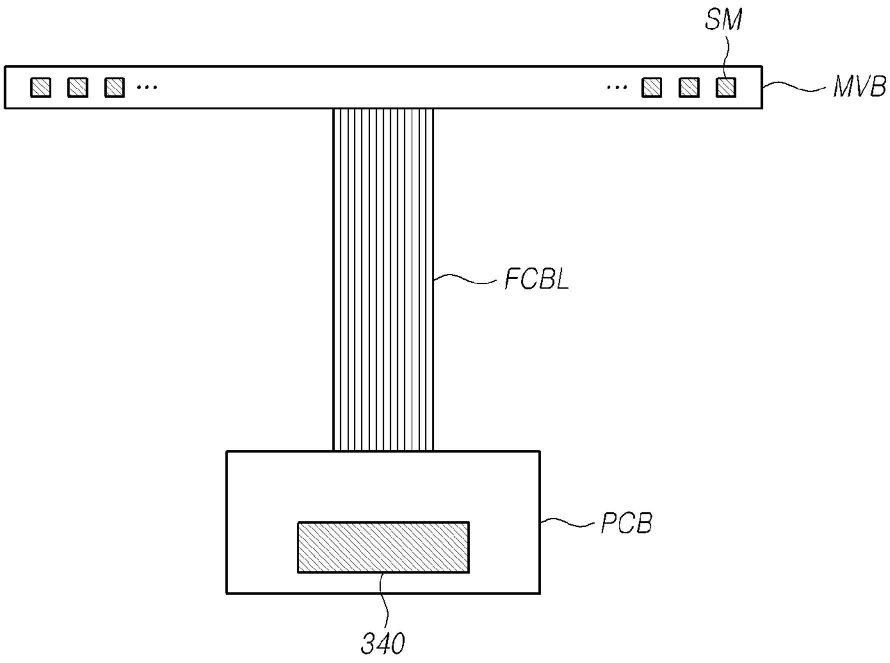
FIGS. 17A and 17B are views illustrating a wired communication scheme and a wireless communication scheme between a plurality of sensor modules and a sensing controller in a display device according to aspects of the disclosure.
Figure 17B:
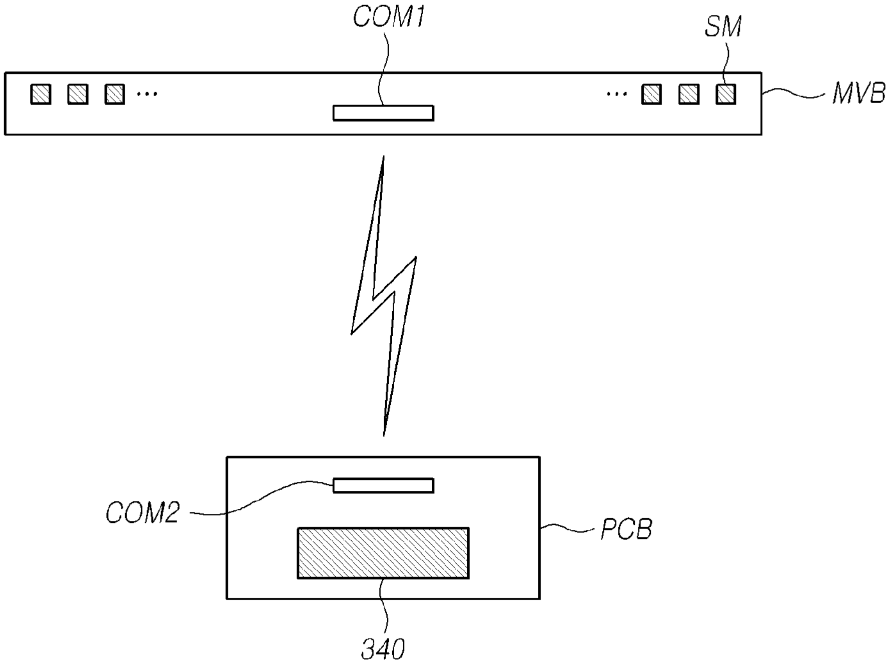

FIGS. 17A and 17B are views illustrating a wired communication scheme and a wireless communication scheme between a plurality of sensor modules SM and a sensing controller 340 in a display device 100 according to aspects of the disclosure.

Referring to FIG. 17A, the plurality of sensor modules SM mounted on the moving bar MVB and the sensing controller 340 may communicate in a wired scheme.

In this case, as described above, the display device 100 according to aspects of the disclosure may include a printed circuit board PCB on which the sensing controller 340 is mounted and which is coupled to the housing 310 and a flexible cable FCBL connecting the printed circuit board PCB with the moving bar MVB. For example, the flexible cable FCBL may be, e.g., a flexible printed circuit (FPC) or a flexible flat cable (FFC).

Referring to FIG. 17A, the length of the flexible cable FCBL may be larger than or equal to the maximum moving distance of the moving bar MVB. Accordingly, while the moving bar MVB moves, the flexible cable may maintain the connection between the moving bar MVB and the printed circuit board PCB.

Referring to FIG. 17B, the plurality of sensor modules SM mounted on the moving bar MVB and the sensing controller 340 may communicate in a wireless scheme. In this case, the display device 100 according to aspects of the disclosure may include a first communication module COM1 mounted on the moving bar MVB and transmitting the sensing value of each of the plurality of sensor modules SM and a second communication module COM2 that receives the sensing value from the communication module COM1 and transfers it to the sensing controller 340.

The first communication module COM1 and the second communication module COM2 may communicate in a short-range wireless scheme, such as Bluetooth, or in a wireless communication scheme using an access point, such as a wireless fidelity (Wi-Fi) scheme.

When the plurality of sensor modules SM mounted on the moving bar MVB and the sensing controller 340 communicate in a wireless scheme, the sensing controller 340 may communicate with an external server through an access point. The sensing controller 340 may communicate with an external server to receive reference information (e.g., reference luminance) for calculating a compensation value.

Figure 18:
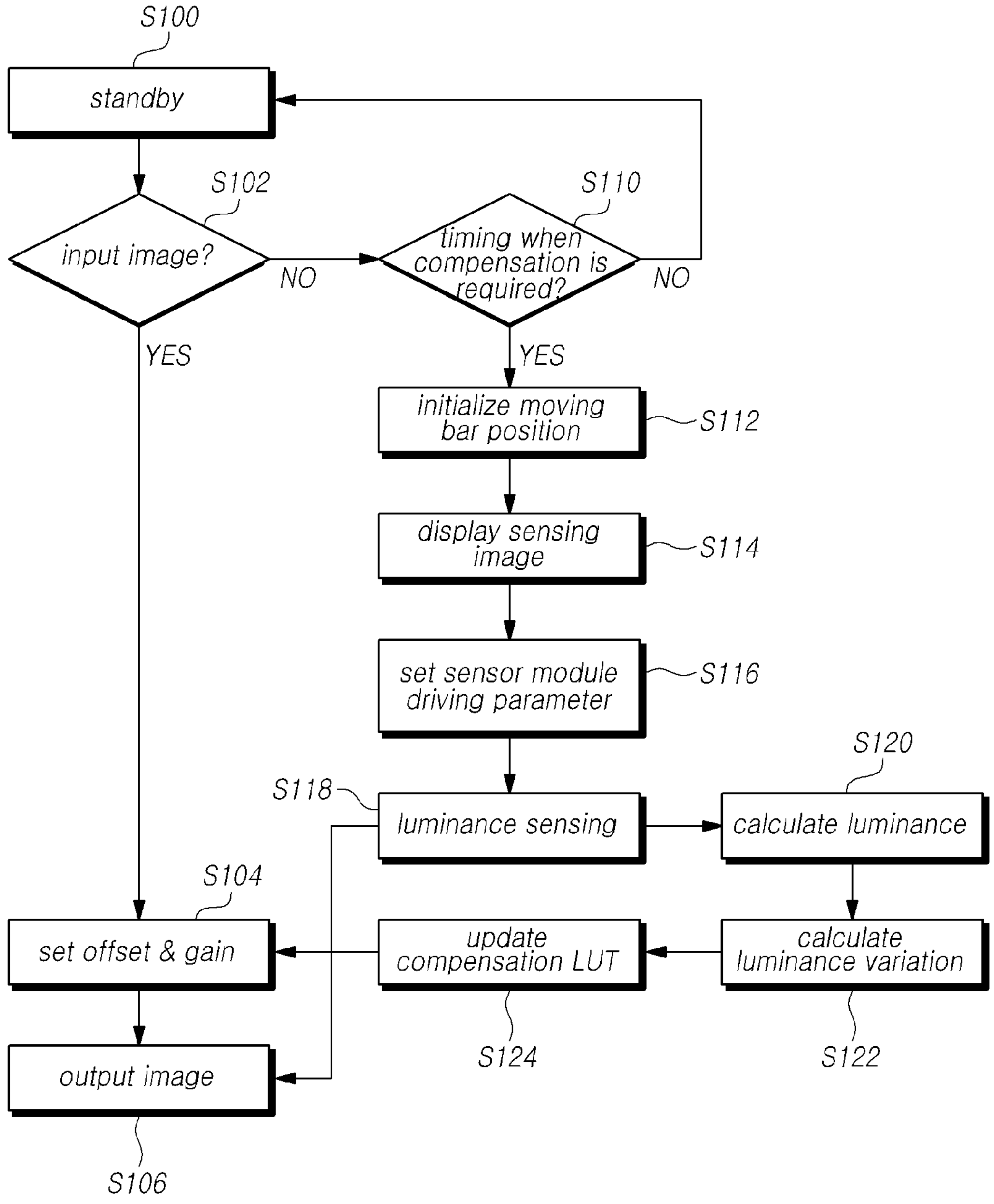
FIG. 18 is a flowchart illustrating a rear sensing-based compensation method of a display device according to aspects of the disclosure.

FIG. 18 is a flowchart illustrating a rear sensing-based compensation method of a display device 100 according to aspects of the disclosure.

Referring to FIG. 18, while in the standby state (S100), the display controller 140 determines whether an image signal is input from the host module 150 (S102).

Referring to FIG. 18, when it is determined in step S102 that an image signal is input from the host module 150, the display controller 140 may set the compensation values (e.g., offset and gain) stored in the compensation LUT (S104) to perform data change processing and control to output an image to the display panel 110 using the changed data (S106).

Referring to FIG. 18, when it is determined that an image signal is not input from the host module 150 as a result of the determination in step S102 by the display controller 140, the display controller 140 or the sensing controller 340 determines whether the timing is a timing when compensation is required (S110). In this case, the display controller 140 or the sensing controller 340 may determine whether the timing is a timing when compensation is required based on, e.g., current time information, previous compensation time information, and compensation period information.

If the display controller 140 or the sensing controller 340 does not determine that the timing is a timing when compensation is required in step S110, the display controller 140 performs a state change to the standby state and waits for a predetermined time (S100).

If the display controller 140 or the sensing controller 340 determines that the timing is a timing when compensation is required in step S110, the sensing controller 340 may initialize the position of the moving bar MVB to the initial point P0 (S112) and control to display a sensing image on the display panel 110 (S114).

The sensing controller 340 may set sensor module driving parameters (S116). The sensor module driving parameters may include, e.g., movement control information (e.g., moving speed and moving direction) of the moving bar MVB and sensing operation information about the sensor module SM (e.g., trigger time, trigger period, and light exposure time).

Although FIG. 18 illustrates that the steps are performed in the order of steps S112, S114, and S116, the order of performing steps S112, S114, and S116 may be varied without limitations thereto.

Steps S112, S114, and S116 are pre-processing steps before the moving bar MVB actually starts moving so that the sensing operation of the plurality of sensor modules SM is executed.

After steps S112, S114, and S116 are performed, the moving bar MVB moves while luminance sensing is performed by the plurality of sensor modules SM mounted on the moving bar MVB (S118).

If the moving bar MVB moves from the rear upper end to the rear lower end of the display panel 110 so that the plurality of sensor modules SM complete luminance sensing for the entire display area DA of the display panel 110, the sensing controller 340 calculates the luminance for the plurality of subpixels SP using the sensing data (sensing values) received from the plurality of sensor modules SM (S120).

The sensing controller 340 compares the calculated luminance value for the plurality of subpixels SP with the previously stored reference luminance to calculate the variation in luminance for the plurality of subpixels SP (S122).

The sensing controller 340 may calculate compensation values for the plurality of subpixels SP based on the calculated luminance variation for the plurality of subpixels SP and update the compensation LUT (S124).

Figure 19:
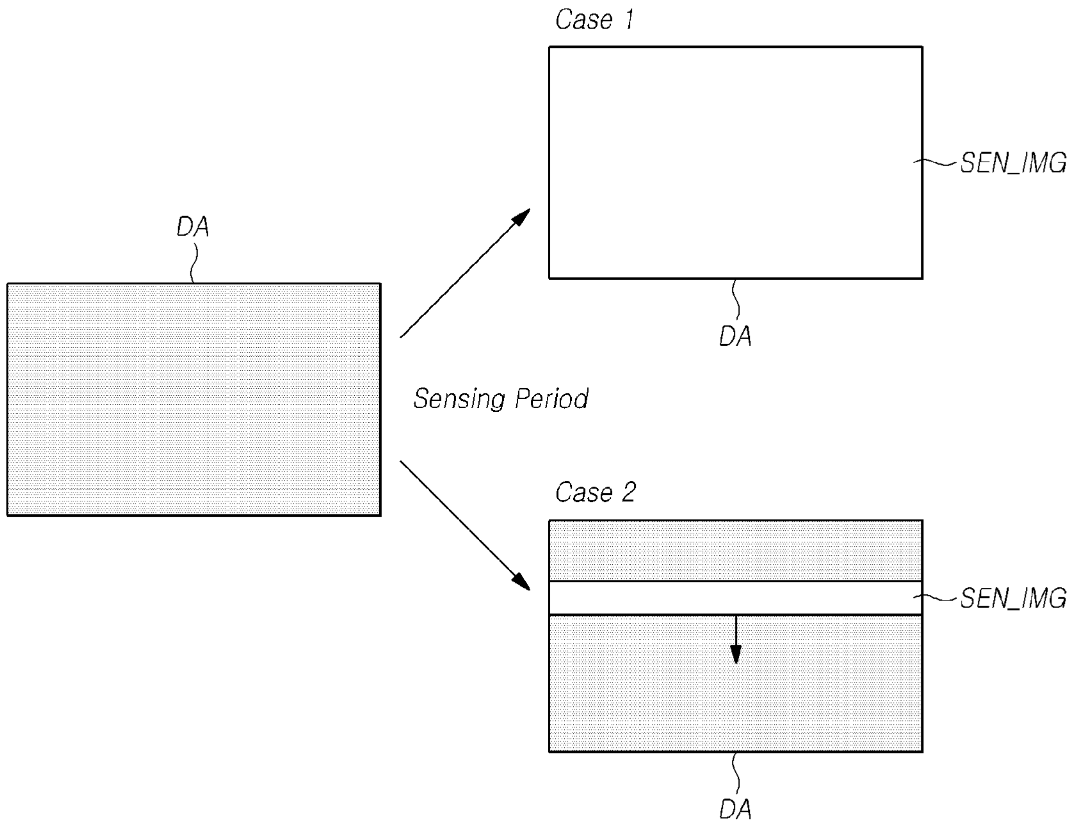
FIG. 19 illustrates schemes for displaying a sensing image on a display panel while a rear sensing operation is in progress in a display device according to aspects of the disclosure.

FIG. 19 illustrates schemes for displaying a sensing image on a display panel while a rear sensing operation is in progress in a display device 100 according to aspects of the disclosure.

Referring to FIG. 19, when the display device 100 according to aspects of the disclosure performs a rear sensing operation, a sensing image SEN_IMG may be displayed on the display panel 110. The sensing image SEN_IMG is a sensing-only image displayed during a rear sensing operation and may be an image different from the image viewed by the user.

Referring to FIG. 19, in the display device 100 according to aspects of the disclosure, the moving bar MVB may move and the plurality of sensor modules SM may operate while the sensing image SEN_IMG is being displayed on the display panel 110.

The display scheme of the sensing image SEN_IMG may include a full area and fixed display scheme (Case 1) and a partial area and moving display scheme (Case 2).

In the full area and fixed display scheme (Case 1), the sensing image SEN_IMG may be displayed on the entire display area DA of the display panel 110 while the moving bar MVB moves.

In the partial area and moving display scheme (Case 2), while the moving bar MVB moves, the sensing image SEN_IMG may be displayed while moving in the display area DA of the display panel 110, and the area in which the sensing image SEN_IMG is displayed may overlap the moving bar MVB.

The foregoing aspects are briefly described below.

Aspects of the disclosure may provide a display device comprising a display panel including a plurality of light emitting elements, a moving bar movable on a rear surface of the display panel, and a plurality of sensor modules mounted on the moving bar and configured to sense sensing light emitted from a rear surface of the display panel.

The display device according to aspects of the disclosure may further comprise a sensing controller configured to control a movement of the moving bar and receive a sensing value from at least one of the plurality of sensor modules.

In the display device according to aspects of the disclosure, the display panel may include a plurality of sensing light emission holes for emitting the sensing light to the rear surface of the display panel.

In the display device according to aspects of the disclosure, each of the plurality of sensing light emission holes may overlap at least three sensor modules.

In the display device according to aspects of the disclosure, the plurality of sensing light emission holes may be disposed, one for each subpixel or for each pixel. One pixel may include two or more subpixels.

In the display device according to aspects of the disclosure, the plurality of sensing light emission holes may include a plurality of horizontal line-shaped sensing light emission holes and a plurality of vertical line-shaped sensing light emission holes. The plurality of horizontal line-shaped sensing light emission holes and the plurality of vertical line-shaped sensing light emission holes may be alternately arranged.

In the display device according to aspects of the disclosure, each of the plurality of sensing light emission holes may have a diagonal line shape.

The display panel according to aspects of the disclosure may further comprise a display light emission path layer being a path through which display light is emitted to a viewing surface of the display panel and a sensing light emission path layer being a path through which sensing light is emitted to a rear surface of the display panel, which is opposite to the viewing surface of the display panel, wherein the sensing light emission path layer includes the plurality of sensing light emission holes.

In the display device according to aspects of the disclosure, the sensing light emission path layer may include a plurality of sensing light emission holes.

When the display device according to aspects of the disclosure has a top-emission structure, the display panel may include a plurality of pixel electrodes, a plurality of light emitting layers respectively disposed on the plurality of pixel electrodes, a common electrode positioned on the plurality of light emitting layers, an encapsulation layer positioned on the common electrode, and a plurality of transistors positioned under the plurality of pixel electrodes and respectively connected to the plurality of pixel electrodes.

The plurality of pixel electrodes may be formed of a reflective metal, and the common electrode may be formed of a transparent metal.

The plurality of sensing light emission holes may pass through a plurality of insulation layers positioned under the plurality of pixel electrodes. Each of the plurality of sensing light emission holes may be positioned between the plurality of transistors.

When the display device according to aspects of the disclosure has a bottom-emission structure, the display panel may include a plurality of pixel electrodes, a plurality of light emitting layers respectively disposed under the plurality of pixel electrodes, a common electrode positioned under the plurality of light emitting layers, an encapsulation layer positioned under the common electrode, and a plurality of transistors positioned over the plurality of pixel electrodes and respectively connected to the plurality of pixel electrodes.

The plurality of pixel electrodes may be formed of a transparent metal, and the common electrode may be formed of a reflective metal.

The plurality of sensing light emission holes may pass through the common electrode and the encapsulation layer.

In the display device according to aspects of the disclosure, each of the plurality of sensor modules may include a luminance sensor for sensing luminance of sensing light emitted through at least one of the plurality of sensing light emission holes and a light controller positioned between a rear surface of the display panel and the luminance sensor.

In the display device according to aspects of the disclosure, a moving distance of the moving bar may correspond to an integer multiple of an inter-center interval between sensing light emission holes adjacent in a vertical direction.

The display device according to aspects of the disclosure may further comprise a moving guide device including a scanning rail moving together with the moving bar and a motor for rotating a shaft on which the scanning rail is wound or unwound.

In the display device according to the aspect of the disclosure, the sensing controller may control to display a sensing image on the display panel, control one or more of a moving speed and moving direction of the moving bar, and control a sensing operation of each of the plurality of sensor modules and may receive a sensing value for luminance from at least one of the plurality of sensor modules, generate a compensation value based on the received sensing value, and store the generated compensation value.

In the display device according to aspects of the disclosure, while a sensing image different from an image viewed by a user is displayed on the display panel, the moving bar may be moved, and the plurality of sensor modules may be operated.

In the display device according to aspects of the disclosure, while the moving bar moves, the sensing image is displayed on an entire display area of the display panel or displayed on a partial area of the display area, when the sensing image is displayed on the partial area of the display area, the partial area is moved according to the movement of the moving bar and overlaps the movement bar.

In the display device according to aspects of the disclosure, while the moving bar moves, the sensing image may be displayed while moving in a display area of the display panel, and an area where the sensing image is displayed may overlap the moving bar.

Aspects of the disclosure may provide a display device comprising a display panel including a plurality of light emitting elements and a plurality of sensing light emission holes through which light is emitted to a rear surface opposite to a viewing surface, and a plurality of sensor modules configured to sense light emitted through at least one of the plurality of sensing light emission holes.

The display device according to aspects of the disclosure may further comprise a sensing controller receiving a sensing value from at least one of the plurality of sensor modules.

The display device according to aspects of the disclosure may further include a moving bar movable on the rear surface of the display panel.

In the display device according to aspects of the disclosure, the plurality of sensor modules may be mounted on the moving bar.

In the display device according to aspects of the disclosure, a moving distance of the moving bar may correspond to an integer multiple of an inter-center interval between sensing light emission holes adjacent in a vertical direction.

According to aspects of the disclosure as described above, there may be provided a display device capable of sensing the luminance of subpixels and compensating for the luminance deviation between subpixels even without the need for a complicated subpixel structure and complicated signal line structure and complicated sensing driving.

According to aspects of the disclosure, there may be provided a display device capable of performing an accurate compensation function by using a rear sensing structure of a display panel.

According to aspects of the disclosure, there may be provided a display device capable of performing an accurate compensation function by configuring a rear sensing structure of a display panel to be movable.

According to aspects of the disclosure, there may be provided a display device having a higher aperture ratio and higher resolution by sensing the luminance of subpixels and compensating for the luminance deviation between the subpixels without a complex subpixel structure and a complex signal line structure.

The above description has been presented to enable any person skilled in the art to make and use the technical idea of the disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the disclosure. The above description and the accompanying drawings provide an example of the technical idea of the disclosure for illustrative purposes only. That is, the disclosed aspects are intended to illustrate the scope of the technical idea of the disclosure. Thus, the scope of the disclosure is not limited to the aspects shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A display device, comprising:

a display panel including a substrate on which a plurality of light emitting elements, are disposed;

a plurality of sensor modules configured to sense light passing through a rear surface of the display panel, which is opposite to a viewing surface of the display panel; and a sensing controller configured to receive a sensing value from at least one of the plurality of sensor modules, wherein the display panel further includes a plurality of sensing light emission holes for directing the light emitted from the plurality of light emitting elements to the rear surface of the display panel, and wherein at least one sensor module among the plurality of sensor modules is configured to receive the light emitted directly from at least one light emitting element among the plurality of light emitting elements through at least one sensing light emission hole among the plurality of sensing light emission holes without an intervening layer between the at least one sensor module and the at least one light emitting element, wherein one end of each of the plurality of sensing light emission holes passes through a portion of the substrate, and another end thereof contacts a pixel electrode of a corresponding one of the plurality of light emitting elements.

2. The display device of claim 1, wherein each of the plurality of sensing light emission holes overlaps with at least three sensor modules.

3. The display device of claim 1, wherein each of the plurality of sensing light emission holes is disposed in each subpixel.

4. The display device of claim 1, wherein each of the plurality of sensing light emission holes is disposed in each pixel having at least two subpixels.

5. The display device of claim 1, wherein the plurality of sensing light emission holes includes a plurality of horizontal line-shaped sensing light emission holes and a plurality of vertical line-shaped sensing light emission holes, and wherein the plurality of horizontal line-shaped sensing light emission holes and the plurality of vertical line-shaped sensing light emission holes are alternately arranged.

6. The display device of claim 1, wherein each of the plurality of sensing light emission holes has a diagonal line shape.

7. The display device of claim 1, wherein the display panel comprises:

a display light emission path layer being a path through which display light is emitted to the viewing surface of the display panel; and a sensing light emission path layer being a path through which the light is emitted to the rear surface of the display panel, which is opposite to the viewing surface of the display panel, wherein the sensing light emission path layer includes the plurality of sensing light emission holes.

8. The display device of claim 1, wherein the display panel includes:

a plurality of pixel electrodes;

a plurality of light emitting layers disposed on the plurality of pixel electrodes;

a common electrode positioned on the plurality of light emitting layers and formed of a transparent metal;

an encapsulation layer positioned on the common electrode; and a plurality of transistors positioned under the plurality of pixel electrodes and connected to the plurality of pixel electrodes, wherein the plurality of pixel electrodes are formed of a reflective metal, wherein the plurality of sensing light emission holes pass through a plurality of insulation layers positioned under the plurality of pixel electrodes, and wherein each of the plurality of sensing light emission holes is positioned between the plurality of transistors.

9. The display device of claim 1, wherein each of the plurality of sensor modules includes:

a luminance sensor configured to sense luminance of the light; and a light controller positioned between the rear surface of the display panel and the luminance sensor for transferring the light emitted from the at least one light emitting element to the luminance sensor.

10. The display device of claim 1, further comprising a moving bar movable on the rear surface of the display panel under the control of the sensing controller, wherein a sensor module is mounted on the moving bar.

11. The display device of claim 10, wherein a moving distance of the moving bar corresponds to an integer multiple of an inter-center interval between sensing light emission holes adjacent in a vertical direction.

12. The display device of claim 10, further comprising:

a moving guide device including a scanning rail moving together with the moving bar; and a motor for rotating a shaft on which the scanning rail is wound or unwound.

13. The display device of claim 10, wherein the sensing controller is configured to:

control to display a sensing image on the display panel, control one or more of a moving speed and moving direction of the moving bar, control a sensing operation of each of the plurality of sensor modules, receive a sensing value for luminance from at least one of the plurality of sensor modules, generate a compensation value based on the received sensing value, and store the generated compensation value.

14. The display device of claim 13, wherein the sensing image is displayed on an entire display area of the display panel or displayed on a partial area of the display area while the moving bar moves, and wherein the partial area is moved according to the movement of the moving bar and overlaps the moving bar when the sensing image is displayed on the partial area of the display area.

15. The display device of claim 10, wherein the moving bar is moved and the plurality of sensor modules are operated while a sensing image different from an image viewed by a user is displayed on the display panel.

16. The display device of claim 1, wherein each light emitting element includes a transparent electrode disposed at a distal end of the at least one sensing light emission hole.

17. The display device of claim 1, wherein the at least one light emission hole guides the light emitted from at least one light emitting element to the at least one sensor module to detect luminance deviation of the plurality of light emitting elements.

18. A display device, comprising:

a display panel including a substrate on which a plurality of light emitting elements are disposed, and including a plurality of sensing light emission holes through which light is emitted to a rear surface opposite to a viewing surface;

a plurality of sensor modules configured to sense light emitted through at least one of the plurality of sensing light emission holes; and a sensing controller configured to receive a sensing value from at least one of the plurality of sensor modules, wherein at least one sensor module is configured to receive the light emitted directly from at least one light emitting element among the plurality of light emitting elements through at least one sensing light emission hole without an intervening layer between the at least one sensor module and the at least one light emitting element, wherein one end of each of the plurality of sensing light emission holes passes through a portion of the substrate, and another end thereof contacts a pixel electrode of a corresponding one of the plurality of light emitting elements.

19. The display device of claim 18, further comprising a moving bar movable on the rear surface of the display panel, wherein the plurality of sensor modules are mounted on the moving bar.

20. The display device of claim 19, wherein a moving distance of the moving bar corresponds to an integer multiple of an inter-center interval between sensing light emission holes adjacent in a vertical direction.

* * * * *